US011835931B2

(12) United States Patent
Iwanami

(10) Patent No.: US 11,835,931 B2
(45) Date of Patent: Dec. 5, 2023

(54) INFORMATION PROCESSING APPARATUS, INFORMATION PROCESSING METHOD, AND STORAGE MEDIUM

(71) Applicant: SONY CORPORATION, Tokyo (JP)

(72) Inventor: Hiroshi Iwanami, Tokyo (JP)

(73) Assignee: SONY CORPORATION, Tokyo (JP)

(*) Notice: Subject to any disclaimer, the term of this patent is extended or adjusted under 35 U.S.C. 154(b) by 443 days.

(21) Appl. No.: 16/606,552

(22) PCT Filed: Mar. 1, 2018

(86) PCT No.: PCT/JP2018/007857
§ 371 (c)(1),
(2) Date: Oct. 18, 2019

(87) PCT Pub. No.: WO2018/216299
PCT Pub. Date: Nov. 29, 2018

(65) Prior Publication Data
US 2021/0116875 A1    Apr. 22, 2021

(30) Foreign Application Priority Data

May 26, 2017    (JP) .................... 2017-104720

(51) Int. Cl.
G05B 15/02    (2006.01)
B60K 28/02    (2006.01)
(Continued)

(52) U.S. Cl.
CPC .............. G05B 15/02 (2013.01); B60K 28/02 (2013.01); E05B 65/0042 (2013.01); G08B 21/24 (2013.01)

(58) Field of Classification Search
CPC ...... G05B 15/02; B60K 28/02; E05B 65/0042; G08B 21/24; B60W 50/14;
(Continued)

(56) References Cited

U.S. PATENT DOCUMENTS 10,446,018 B1 * 10/2019 Han ................. G08B 21/182
2002/0159179 A1    10/2002 Nagai et al.
(Continued)

FOREIGN PATENT DOCUMENTS

AT    13 308 U1 * 10/2013
JP    09-198588 A    7/1997
(Continued)

OTHER PUBLICATIONS

International Search Report and Written Opinion of PCT Application No. PCT/JP2018/007857, dated May 15, 2018, 07 pages of ISRWO.
(Continued)

Primary Examiner — Michael W Choi
(74) Attorney, Agent, or Firm — CHIP LAW GROUP

(57) ABSTRACT

To provide an information processing apparatus capable of enhancing an illegal action prevention effect by restricting an operation leading to an illegal action, an information processing method, and a storage medium. An information processing apparatus including a sensor data acquisition part configured to acquire sensor data output from a sensor, and a control part configured to restrict an operation on an object of interest when detecting a person who is likely to violate a predetermined rule after operating the object of interest on the basis of the sensor data, and to remove the restriction of the operation on the object of interest after giving a warning on the basis of the predetermined rule via a notification part.

14 Claims, 16 Drawing Sheets

(51) Int. Cl.
   *E05B 65/00* (2006.01)
   *G08B 21/24* (2006.01)

(58) Field of Classification Search
   CPC ....... B60W 2540/043; B65F 1/00; B65F 1/16;
   F25D 23/00; F25D 23/02; G08G 1/00;
   G10K 15/02
   See application file for complete search history.

(56) References Cited

U.S. PATENT DOCUMENTS

| | | | | |
|---|---|---|---|---|
| 2006/0237427 | A1* | 10/2006 | Logan | G07C 9/37 |
| | | | | 219/401 |
| 2013/0202121 | A1* | 8/2013 | Georgiou | H04R 1/1091 |
| | | | | 381/56 |
| 2014/0114502 | A1* | 4/2014 | Hugron | B60W 30/146 |
| | | | | 701/1 |
| 2015/0019266 | A1* | 1/2015 | Stempora | G06Q 40/08 |
| | | | | 705/4 |

FOREIGN PATENT DOCUMENTS

| | | | |
|---|---|---|---|
| JP | 2003-223190 A | | 8/2003 |
| JP | 2006028795 A | * | 2/2006 |
| JP | 2008-174325 A | | 7/2008 |
| JP | 2009-098969 A | | 5/2009 |
| JP | 2009-282861 A | | 12/2009 |
| JP | 2010-020575 A | | 1/2010 |
| JP | 2010020575 A | * | 1/2010 |
| JP | 2011-107909 A | | 6/2011 |
| JP | 2011-192031 A | | 9/2011 |
| JP | 2015-118438 A | | 6/2015 |

OTHER PUBLICATIONS

Office Action for JP Patent Application No. 2019-519475, dated Mar. 15, 2022, 03 pages of English Translation and 03 pages of Office Action.

* cited by examiner

FIG. 8

| PERSON ID | NUMBER OF TIMES OF RULE VIOLATION IN PAST SIX MONTHS | RECORD OF RULE VIOLATION | RECORD OF RULE VIOLATION | RECORD OF RULE VIOLATION | RECORD OF RULE VIOLATION | RECORD OF RULE VIOLATION |
|---|---|---|---|---|---|---|
| 00011 (Mr./Ms. A) | 3 | 2017/03/01 10:02 | 2017/02/01 19:22 | 2017/01/21 18:02 | 2015/07/11 21:20 | NULL |
| 00012 | 0 | 2016/08/21 9:37 | 2015/01/01 19:22 | NULL | | |
| 00013 | 1 | 2017/02/21 23:21 | 2016/06/09 17:32 | 2015/10/11 22:34 | NULL | |
| ... | ... | ... | ... | ... | ... | ... |

FIG. 12

| PERSON ID | DOOR OPENING/CLOSING TIME/DATE | DOOR OPENING/CLOSING TIME/DATE | DOOR OPENING/CLOSING TIME/DATE | DOOR OPENING/CLOSING TIME/DATE | DOOR OPENING/CLOSING TIME/DATE |
|---|---|---|---|---|---|
| 00001 | 2017/03/03 16:30 | 2017/03/03 14:52 | 2017/03/03 14:30 | 2017/03/03 14:04 | 2017/03/02 16:09 |
| 00002 | 2017/03/03 15:02 | 2017/03/03 11:20 | 2017/03/02 15:21 | 2017/03/02 14:30 | 2017/03/02 10:01 |
| 00003 | 2017/03/03 14:50 | 2017/03/03 10:51 | 2017/03/02 12:02 | NULL | |
| ... | ... | ... | ... | ... | ... |

INFORMATION PROCESSING APPARATUS, INFORMATION PROCESSING METHOD, AND STORAGE MEDIUM

CROSS REFERENCE TO RELATED APPLICATIONS

This application is a U.S. National Phase of International Patent Application No. PCT/JP2018/007857 filed on Mar. 1, 2018, which claims priority benefit of Japanese Patent Application No. JP 2017-104720 filed in the Japan Patent Office on May 26, 2017. Each of the above-referenced applications is hereby incorporated herein by reference in its entirety.

TECHNICAL FIELD

The present disclosure relates to an information processing apparatus, an information processing method, and a storage medium.

BACKGROUND ART

In our world today, there are many rules to be followed in order to organize our social life. For example, garbage pickup days are determined depending on the kinds of garbage by a local government for garbage disposal in a local area. There arise problems in which garbage disposed on other than the predetermined days remains at a garbage pickup place, the uncollected garbage spoils the appearance of the area, raw garbage smells, or the uncollected garbage is eaten away by wild animals.

Further, the traffic rules are defined under the laws, and a warning is given by traffic signs, electric message boards, and the like.

Here, as a technology for causing a user to follow a rule, Patent Document 1 described below discloses a technology for switching a manual driving mode to a forcible driving mode when there is a danger, and returning to the manual driving mode under a predetermined restriction removal condition, for example.

Further, Patent Document 2 described below discloses a management system for periodically monitoring a user terminal (collecting environment information and comparing policy definitions), restricting the operations of the user terminal depending on the number of times of policy violation, and removing the operation restriction in a case where electronic education is completed.

Further, Patent Document 3 described below discloses a control apparatus for prohibiting driving or calling (disabled driving or disabled calling), and warning a driver or notifying a person in charge in a case where an in-vehicle camera detects that the driver is holding a cell phone and calling.

CITATION LIST

Patent Document

Patent Document 1: Japanese Patent Application Laid-Open No. 2015-118438
Patent Document 2: Japanese Patent Application Laid-Open No. 2009-98969
Patent Document 3: Japanese Patent Application Laid-Open No. 2011-192031

SUMMARY OF THE INVENTION

Problems to be Solved by the Invention

However, in the above conventional technology, an operation is restricted or a warning is given always after an illegal action is committed, and thus the illegal action cannot be regulated in advance. Further, with the technology described in Patent Document 2, periodical monitoring is performed irrespective of a timing of an illegal action, and an operation is restricted at a monitoring timing, and thus the operation is not restricted at the same time with the illegal action.

Thus, the present disclosure proposes an information processing apparatus capable of enhancing an illegal action prevention effect by restricting an operation leading to an illegal action, an information processing method, and a storage medium.

Solutions to Problems

According to the present disclosure, there is proposed an information processing apparatus including a sensor data acquisition part configured to acquire sensor data output from a sensor, and a control part configured to restrict an operation on an object of interest when detecting a person who is likely to violate a predetermined rule after operating the object of interest on the basis of the sensor data, and to remove the restriction of the operation on the object of interest after giving a warning on the basis of the predetermined rule via a notification part.

According to the present disclosure, there is proposed an information processing method by a processor including acquiring sensor data output from a sensor, and restricting an operation on an object of interest when detecting a person who is likely to violate a predetermined rule after operating the object of interest on the basis of the sensor data, and removing the restriction of the operation on the object of interest after giving a warning on the basis of the predetermined rule via a notification part.

According to the present disclosure, there is proposed a computer readable storage medium storing a program therein, the program for causing a computer to function as a sensor data acquisition part configured to acquire sensor data output from a sensor, and a control part configured to restrict an operation on an object of interest when detecting a person who is likely to violate a predetermined rule after operating the object of interest on the basis of the sensor data, and to remove the restriction of the operation on the object of interest after giving a warning on the basis of the predetermined rule via a notification part.

Effects of the Invention

As described above, according to the present disclosure, it is possible to enhance an illegal action prevention effect by restricting an operation leading to an illegal action.

Additionally, the above effect is not necessarily restrictive, and any effect described in the present specification or other effect graspable from the present specification can be obtained together with the above effect or instead of the above effect.

BRIEF DESCRIPTION OF DRAWINGS

FIG. 8 is a diagram illustrating an exemplary rule violation history stored in a garbage disposal history database according to the first example.

FIG. 12 is a diagram illustrating an exemplary door opening/closing history stored in a door opening/closing history database according to the second example.

MODE FOR CARRYING OUT THE INVENTION

Figure 1:
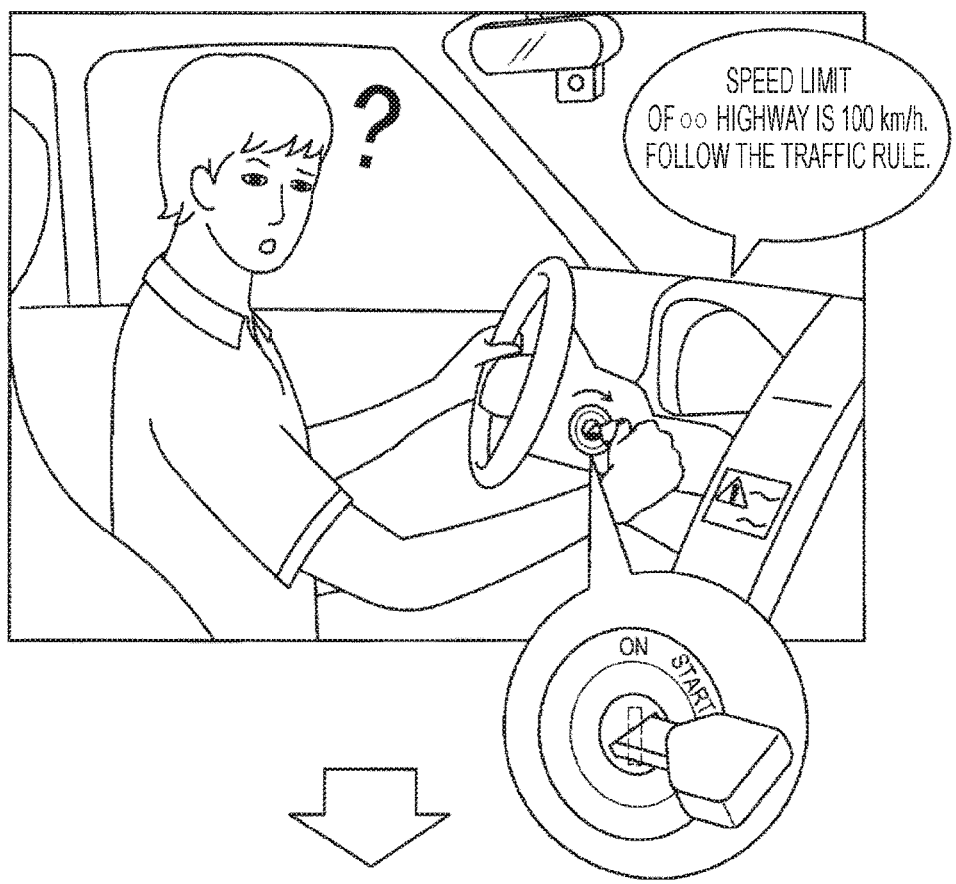
FIG. 1 is a diagram for explaining an online of an information processing system according to one embodiment of the present disclosure.
Figure 1:
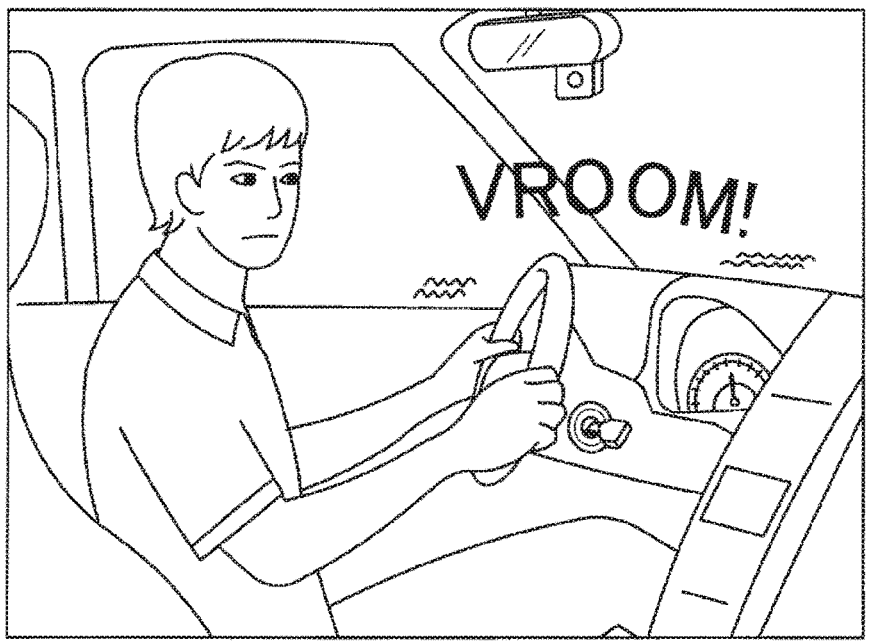

A preferred embodiment of the present disclosure will be described below in detail with reference to the accompanying drawings. Additionally, the components having substantially the same functional configuration are denoted with the same reference numeral and a repeated description thereof will be omitted in the present specification and the drawings.

Further, the description will be made in the following order.

1. Outline of information processing system according to one embodiment of present disclosure
2. Basic configuration and operation processings
2-1. Configuration of information processing apparatus
2-2. Operation processings
3. Examples
3-1. First example
(3-1-1. Configuration)
(3-1-2. Operation processings)
3-2. Second example
(3-2-1. Configuration)
(3-2-2. Operation processings)
3-3. Third example
(3-3-1. Configuration)
(3-3-2. Operation processings)
3-4. Supplements
(3-4-1. System configuration)
(3-4-2. Applications)
4. Conclusion 1. OUTLINE OF INFORMATION PROCESSING SYSTEM ACCORDING TO ONE EMBODIMENT OF PRESENT DISCLOSURE FIG. 1 is a diagram for explaining an outline of an information processing system according to one embodiment of the present disclosure. The information processing system according to the present embodiment can enhance an illegal action prevention effect by restricting an operation leading to an illegal action. More specifically, when a driver is turning the ignition key to start up the engine as illustrated in the upper part of FIG. 1, for example, in a case where it is determined that he/she is likely to violate the rule again with reference to the number of times of past traffic rule violation or the like on the basis of the driving history of the driver, the ignition operation (for starting up the engine) as an operation leading to a traffic rule violation action is restricted. For example, the operation is restricted by disabling the ignition key or preventing the engine from being started up even if the ignition key is turned, for example. Thereby, the user's operation is temporarily stopped to warn the user, and the user is warned by voice or text to follow the traffic rule, thereby reminding the driver of the traffic rule before committing an illegal action and forcibly promoting the driver to follow the rule.

The operation restriction is removed (here, the restriction of the ignition operation is removed to start up the engine) after the warning, and driving is enabled as illustrated in the lower part of FIG. 1. Thereby, the driver (user) can drive as usual, but is expected to brace himself/herself due to the immediately-previous warning, to pay more attention to his/her driving, and to accurately follow the traffic rule.

The outline of the information processing system according to one embodiment of the present disclosure has been described above. How to follow the traffic rule has been described herein by way of example, but the present embodiment is not limited thereto, and an operation leading to an illegal action is restricted and a warning is given thereby to enhance an illegal action prevention effect similarly in following the social rules such as garbage disposal, the domestic rules such as refrigerator opening/closing, or the like.

Subsequently, a basic configuration and operation processings of the information processing system according to the present embodiment will be described with reference to the drawings.

2. CONFIGURATION 2-1. Configuration of Information Processing Apparatus 1

Figure 2:
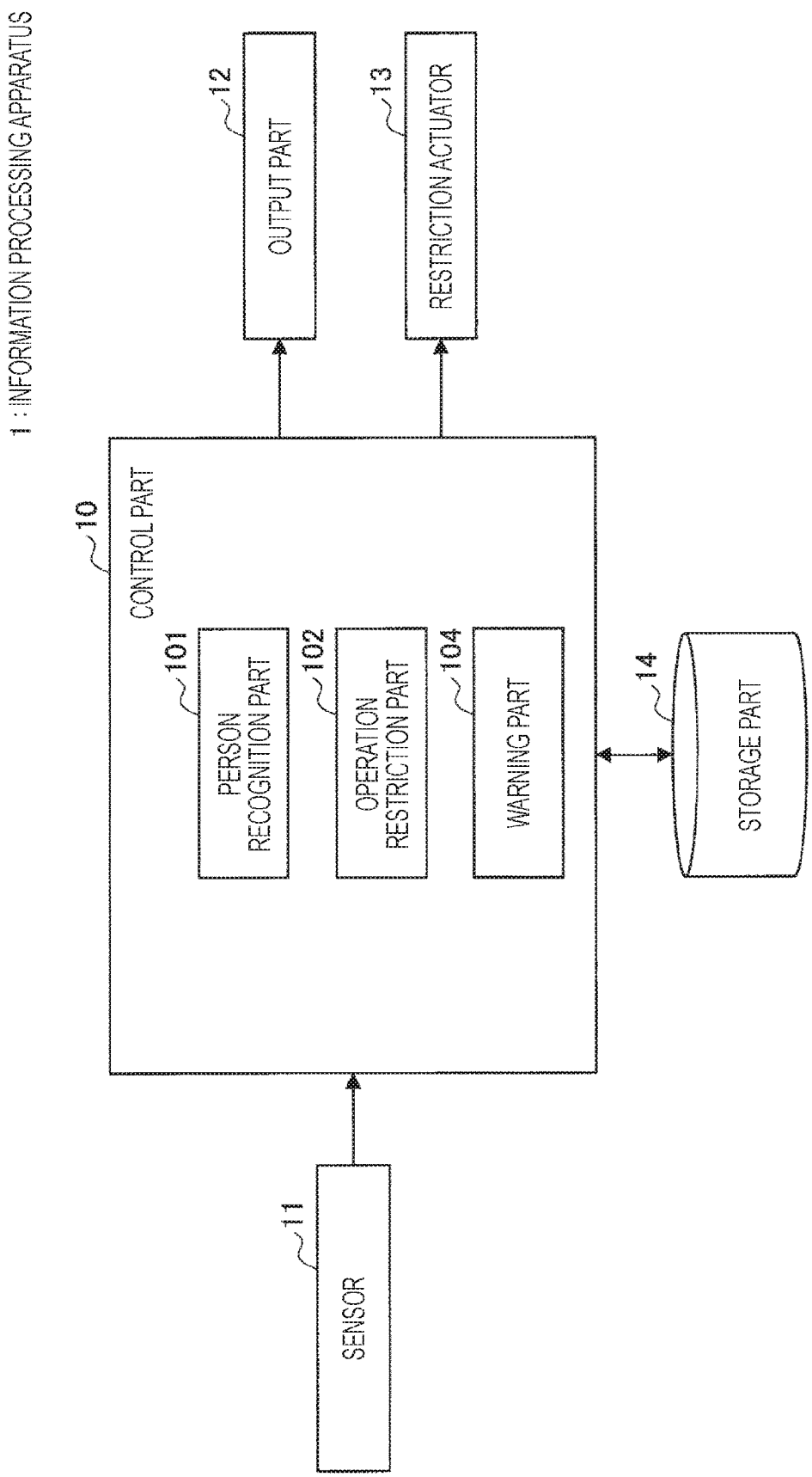
FIG. 2 is a block diagram illustrating an exemplary configuration of an information processing apparatus according to the present embodiment.

FIG. 2 is a block diagram illustrating an exemplary configuration of an information processing apparatus 1 according to the present embodiment. The information processing apparatus 1 has a control part 10, a sensor 11, an output part 12, a restriction actuator 13, and a storage part 14 as illustrated in FIG. 2.

The control part 10 functions as a computation processing apparatus and a control apparatus, and controls the total operations in the information processing apparatus 1 according to various programs. The control part 10 is realized by an electronic circuit such as a central processing unit (CPU) or a microprocessor. Further, the control part 10 may include a read only memory (ROM) for storing programs, computation parameters, and the like to be used, and a random access memory (RAM) for temporarily storing parameters and the like changing as needed.

Further, the control part 10 according to the present embodiment also functions as a person recognition part 101, an operation restriction part 102, and a warning part 104.

The person recognition part 101 recognizes a person present nearby on the basis of information (sensor data) sensed by the sensor 11. For example, the person recognition part 101 analyzes a shot image and detects a face image thereby to detect a person, and further analyzes the face image thereby to specify the person. Further, the person recognition part 101 analyzes collected voice thereby to detect spoken voice and to detect a person, and further analyzes the voice thereby to specify the person.

In a case where the person recognition part 101 detects a person who is likely to violate a predetermined rule after operating an object of interest (which may be the information processing apparatus 1 or may be different from the information processing apparatus 1), the operation restriction part 102 prevents the object of interest from being operated by the restriction actuator 13, thereby substantially preventing the user from performing an operation leading to an illegal action. For example, in a case where a person who is likely to violate the traffic rule is detected, the operation restriction part 102 restricts the engine operation not to start up the engine of the automobile in order to restrict the user from driving the automobile. Further, in a case where a person who does not follow the garbage disposal rule is detected, the operation restriction part 102 locks the lid of the garbage pickup box not to be opened (the lock mechanism corresponds to the restriction actuator 13 in this case).

The warning part 104 controls such that the output part 12 gives a warning to follow a predetermined rule when the operation restriction part 102 restricts an operation. A warning may be given via voice, or may be given by displaying text, image, projection, or the like. Additionally, the operation restriction part 102 according to the present embodiment removes the operation restriction after the warning is given.

(Sensor 11)

The sensor 11 senses various items of information, and outputs the sensed information (sensor data) to the control part 10. The sensor 11 can be realized by a camera, a voice input part (microphone), a human-presence sensor, a biometric sensor (sensor for pulse, vein, heartbeat, blood pressure, body temperature, sweating, breathing, myoelectric value, brain waves, or the like), a motion sensor (acceleration sensor, gyro sensor, geomagnetism sensor, or the like), an opening/closing sensor, an environment sensor (sensor for temperature, humidity, illuminance, rain, wind, or the like), a positioning part, or the like.

(Output Part 12)

The output part 12 corresponds to a notification part for giving a warning for a user under control of the warning part 104. The output part 12 can be realized by a voice output part (speaker), a display part, a projection part, or the like.

(Restriction Actuator 13)

The restriction actuator 13 has a function of restricting an operation on an object of interest under control of the operation restriction part 102 and substantially restricting the user from operating the object of interest before an illegal action. For example, in a case where the engine startup operation of an automobile is restricted, the restriction is realized by a mechanism for locking the ignition key not to turn to the START position (position to ignite or to start up the engine), or not to ignite even if it is turned to the START position.

(Storage Part 14)

The storage part 14 is realized by a read only memory (ROM) for storing programs, computation parameters, and the like used for the processings of the control part 10, and a random access memory (RAM) for temporarily storing parameters and the like changing as needed.

The configuration of the information processing apparatus 1 according to the present embodiment has been specifically described above. Though not illustrated in FIG. 2, the information processing apparatus 1 according to the present embodiment further has an operation input part. The operation input part receives an operation instruction by the user or manager, and outputs its operation contents to the control part 10. The operation input part may be a touch sensor, a pressure sensor, or an approach sensor. Alternatively, the operation input part may be a physical component such as button, switch, or lever.

Further, the information processing apparatus 1 according to the present embodiment may further have a communication part. The communication part is connected to a network in a wired or wireless manner, and can exchange data with various servers (external apparatuses) on the network. Further, the communication part is connected to a peripheral external apparatus in a wireless or wired manner, and can exchange data therewith. The communication part is connected to an external apparatus for communication via wired/wireless local area network (LAN), Wi-Fi (registered trademark), Bluetooth (registered trademark), infrared communication, long term evolution (LTE), third-generation mobile communication system (3G), or the like.

2-2. Operation Processings

Figure 3:
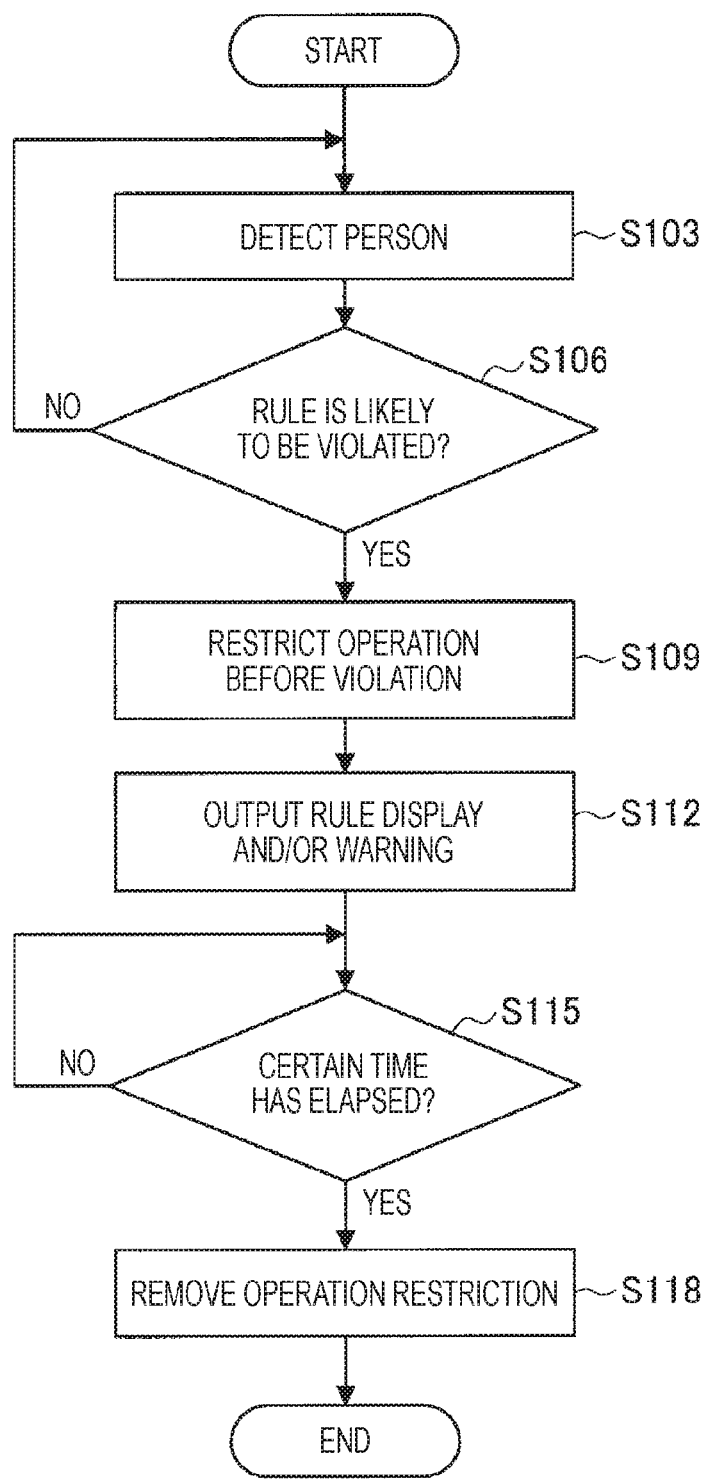
FIG. 3 is a flowchart illustrating operation processings of the information processing system according to the present embodiment.

Operation processings of the information processing system according to the present embodiment will be subsequently described with reference to FIG. 3. FIG. 3 is a flowchart illustrating the operation processings of the information processing system according to the present embodiment.

As illustrated in FIG. 3, the information processing apparatus 1 first detects a person by use of the sensor data from the sensor 11 (for example, a plurality of cameras installed in the city or at home, or the like) (step S103), and determines whether or not the rule is likely to be violated (that is, estimates whether or not the detected person is likely to violate a predetermined rule) (step S106). For example, in a case where it is detected that a person with garbage is approaching on other than the garbage pickup days, the control part 10 determines that the rule is likely to be violated.

The operation restriction part 102 in the information processing apparatus 1 then restricts an operation on the object of interest before an illegal action by the restriction actuator 13, and substantially restricts the user operation on the object of interest (step S109). For example, if the lid of a garbage pickup box is opened, garbage is likely to be disposed therein, and thus it is estimated that an illegal action is done when the lid is opened on other than the garbage pickup days. Thus, opening/closing the lid is restricted in this case. Further, if the door of a refrigerator is opened, a food is likely to be taken out, and thus it is estimated that if a child who overeats sweets opens the door, he/she eats much more (violates the opening/closing rule). Thus, opening/closing the door is restricted in this case. Further, if the engine of an automobile is started up, driving is likely to be started, and thus it is estimated that the traffic rule is violated. Starting up the engine (ignition operation) is restricted in this case.

The warning part 104 in the information processing apparatus 1 then outputs rule display and/or warning from the output part 12 (step S112).

Subsequently, in a case where a certain time has elapsed (step S115/Yes), the operation restriction part 102 in the information processing apparatus 1 removes the operation restriction (step S118).

An operation is restricted to display the rule or to give a warning to follow the rule and then the operation restriction is removed in this way so that the rule can be accurately told to a person who is less likely to know the rule, a warning can be given to a person who knows the rule but does not follow it, and a decrease in illegal actions can be expected.

3. EXAMPLES

Subsequently, the information processing system according to the present embodiment will be specifically described by way of a plurality of examples.

3-1. First Example

A first example will be first described with reference to FIG. 4 to FIG. 8. Prevention of garbage disposal rule violation in a garbage pickup box (information processing apparatus 1) installed in the city or at home will be described according to the first example. The cleaning department in a local government or the like generally picks up garbage at predetermined days, and thus it is assumed that the garbage disposal days or time are defined per area.

3-1-1. Configuration

Figure 4:
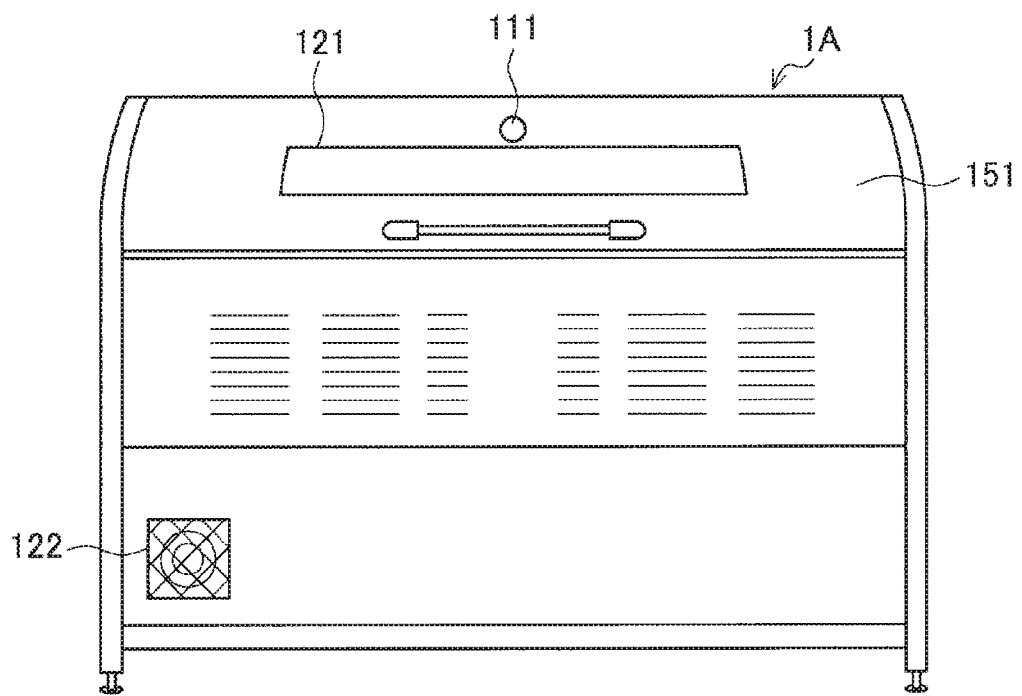
FIG. 4 is an external configuration diagram of an information processing apparatus (garbage pickup box) according to a first example.

FIG. 4 is an external configuration diagram of an information processing apparatus 1A (garbage pickup box) according to the present example. As illustrated in FIG. 4, the information processing apparatus 1A is shaped to have a housing part for housing garbage therein, and is provided with a lid part 151 for opening/closing the opening of the housing part. Further, the information processing apparatus 1A is provided with a camera 111 for capturing a person approaching the garbage pickup box as an example of the sensor 11. Further, a display part 121 and a voice output part 122 are provided as examples of the output part 12.

Figure 5:
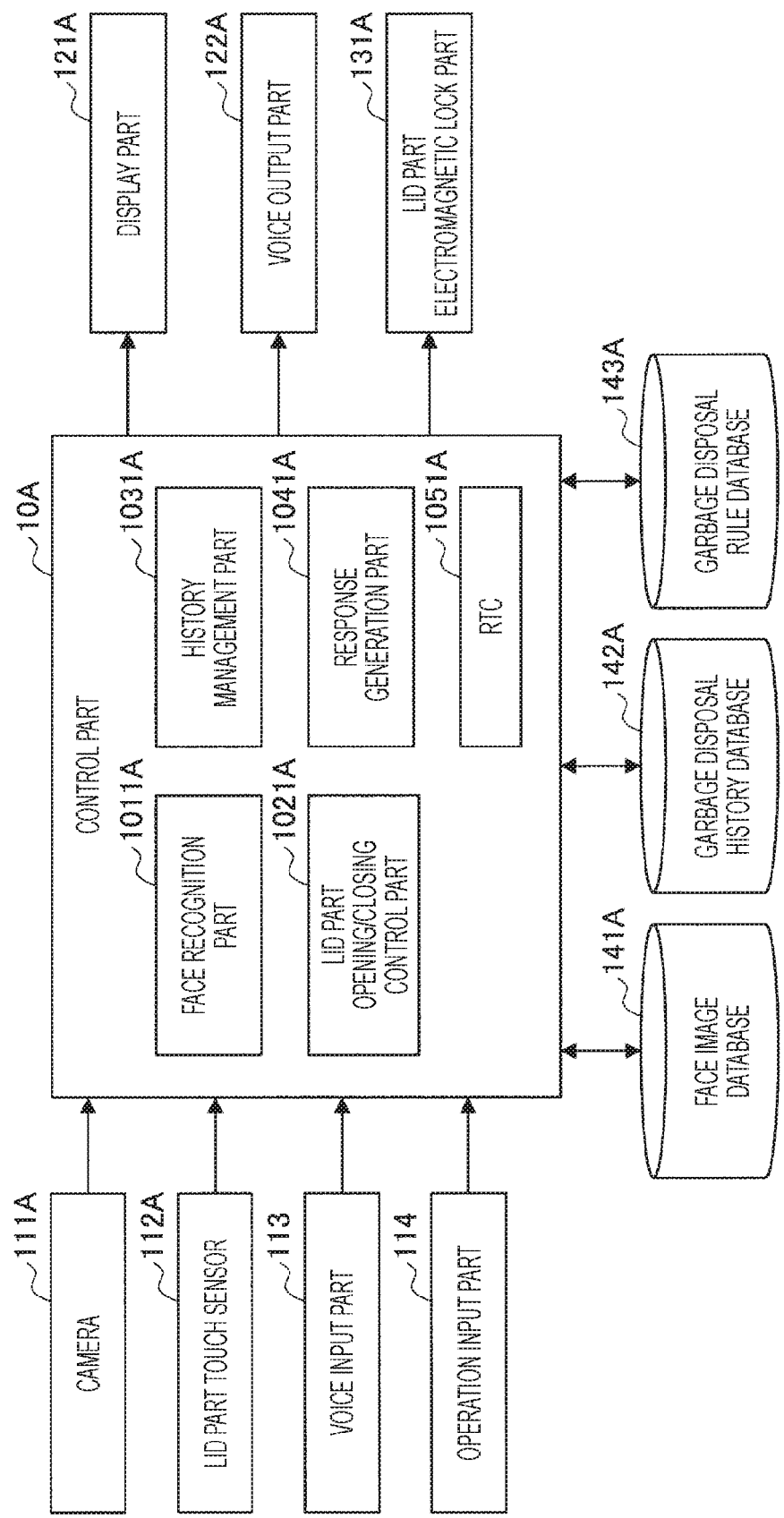
FIG. 5 is an internal configuration diagram of the information processing apparatus (garbage pickup box) according to the first example.

FIG. 5 is an internal configuration diagram of the information processing apparatus 1A (garbage pickup box) according to the present example. As illustrated in FIG. 5, the information processing apparatus 1A has a control part 10A, a camera 111A, a lid part touch sensor 112A, a voice input part 113, an operation input part 114, a display part 121A, a voice output part 122A, a lid part electromagnetic lock part 131A, a face image database 141A, a garbage disposal history database 142A, and a garbage disposal rule database 143A.

(Control Part 10A)

The control part 10A functions as a computation processing apparatus and a control apparatus, and controls the total operations in the information processing apparatus 1A according to various programs. The control part 10A is realized by an electronic circuit such as a central processing unit (CPU) or a microprocessor. Further, the control part 10A may include a read only memory (ROM) for storing programs, computation parameters, and the like to be used, and a random access memory (RAM) for temporarily storing parameters and the like changing as needed.

Further, the control part 10A according to the present embodiment also functions as a face recognition part 1011A, a lid part opening/closing restriction part 1021A, a history management part 1031A, a response generation part 1041A, and a real-time clock (RTC) (also denoted as calendar clock) 1051A.

The face recognition part 1011A detects a face from an image shot by the camera 111A in the pattern matching method or the like for image analysis, and recognizes the detected face image. The detected face image is compared with the face images registered in the face image database 141A thereby to specify the person in the face recognition processing. The face images of the residents are previously registered in the face image database 141A, and the face recognition part 1011A calculates and compares the characteristic amounts of the face images thereby to specify the persons.

The lid part opening/closing restriction part 1021A controls the lid part electromagnetic lock part 131A thereby to restrict opening/closing the lid part.

The history management part 1031A, for example, saves and updates information associated with garbage disposal of each user by use of the garbage disposal history database 142A. For example, the history management part 1031A can record illegal actions such as garbage disposal on other than the predetermined days and time.

The response generation part 1041A generates response information such as rule notification or warning to the user.

The RTC 1051A is a clock incorporated in the information processing apparatus 1A.

(Camera 111A)

The camera 111A has a lens system configured of a shooting lens, a diaphragm, a zoom lens, a focus lens, and the like, a drive system for causing the lens system to perform the focusing operation or the zooming operation, a solid-state shooting device array for photoelectrically converting a shooting light obtained in the lens system and generating a shooting signal, and the like. The solid-state shooting device array may be realized by a charge coupled device (CCD) sensor array or a complementary metal oxide semiconductor (CMOS) sensor array, for example. The camera 111A may be movable.

(Lid Part Touch Sensor 112A)

The lid part touch sensor 112A is provided on the lid part 151 in the information processing apparatus 1A, and senses user's touch on the lid part 151 (specifically, such as the handle of the lid part 151).

(Voice Input Part 113)

The voice input part 113 is realized by a microphone, a microphone amplification part for amplifying a voice signal obtained by the microphone, and an A/D converter for digital-converting to a voice signal, and outputs the voice signal to the control part 10A.

(Operation Input Part 114)

The operation input part 114 receives a user's operation instruction, and outputs its operation contents to the control part 10A. The operation input part 114 may be a touch sensor, a pressure sensor, or an approach sensor. Alternatively, the operation input part 114 may be a physical component such as button, switch, and lever.

(Display Part 121A)

The display part 121A is a display apparatus for outputting rule display or warning display as response information generated by the response generation part 1041A. The display part 121A is provided at a position within the field of view of a user who is disposing garbage, such as near the handle of the lid part 151. Further, the display part 121A may be a display apparatus such as liquid crystal display (LCD) or organic electro luminescence (EL) display.

(Voice Output Part 122A)

The voice output part 122A has a speaker for reproducing a voice signal and an amplifier circuit for the speaker.

(Lid Part Electromagnetic Lock Part 131A)

The lid part electromagnetic lock part 131A is realized by a mechanism for locking the lid part 151 depending on the conducting state. A specific mechanism of the electromagnetic lock part 131A is not particularly limited, but a lock mechanism of lock on conduction type (for example, mechanism for locking when the electromagnetic solenoid is powered on, and unlocking by a spring force. The lock function is not disabled when powered off) may be employed. Further, the description has been made assuming that the electromagnetic lock is used as an exemplary lock mechanism, but the present example is not limited thereto.

(Face Image Database 141A)

The face image information of the previously-registered residents (at least persons who dispose garbage here) is registered in the face image database 141A. Further, the user information (such as personal ID, room number, address, and name) may be registered in association with the face images in the face image database 141A.

(Garbage Disposal History Database 142A)

The history information associated with garbage disposal of each user is stored in the garbage disposal history database 142A.

(Garbage Disposal Rule Database 143A)

The information associated with garbage disposal rule is stored in the garbage disposal rule database 143A.

The configuration of the information processing apparatus 1A has been specifically described above. Additionally, the configuration of the information processing apparatus 1A is not limited to the example illustrated in FIG. 5, and may further have a communication part for connecting to a peripheral external apparatus or a network. Further, at least some of the components in the information processing apparatus 1A illustrated in FIG. 5 may be provided in an external apparatus to be connected to the information processing apparatus 1A for communication.

Further, a garbage pickup box itself is assumed as the information processing apparatus 1A according to the present example, but the present example is not limited thereto, and the information processing system may be configured such that the information processing apparatus 1A different from the garbage pickup box controls the lid part electromagnetic lock part 131A of the garbage pickup box, or the display part 121A or the voice output part 122A provided on or around the garbage pickup box itself.

Further, the information processing system may be configured to restrict not only opening/closing the lid of a "garbage pickup box" but also opening/closing the door of a "garbage pickup room (garbage disposal place)" in an apartment or the like and to give a warning from the display part 121A or the voice output part 122A provided around the door.

3-1-2. Operation Processings

Figure 6:
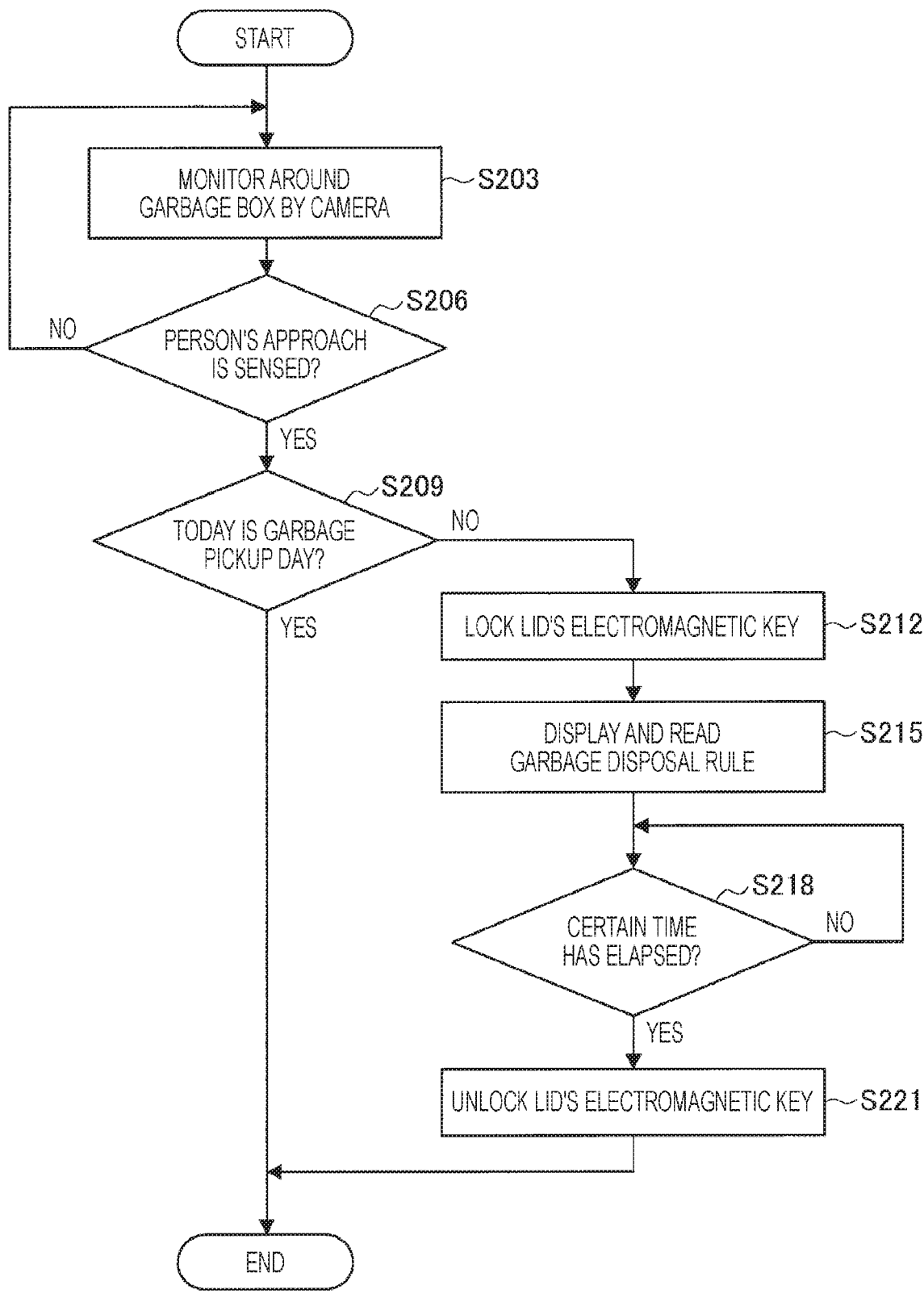
FIG. 6 is a flowchart illustrating operation processings of the information processing apparatus (garbage pickup box) according to the first example.

FIG. 6 is a flowchart illustrating the operation processings of the information processing apparatus 1A (garbage pickup box) according to the first example. As illustrated in FIG. 6, the information processing apparatus 1A first monitors around the garbage box (corresponding to the information processing apparatus 1A, here) by the camera 111A (step S203).

Then, in a case where person's approach is sensed (step S206: Yes), the lid part opening/closing restriction part 1021A in the information processing apparatus 1A confirms whether or not today is a garbage pickup day with reference to the garbage disposal rule (step S209). Additionally, the information processing apparatus 1A may analyze an image shot by the camera 111A, and sense approach of a person with a garbage bag.

Then, in a case where today is not the garbage pickup day (step S209/No), the control part 10A in the information processing apparatus 1A locks the lid's electromagnetic key (step S212), and displays the garbage disposal rule on the display part 121A or/and outputs (reads) it by voice by the voice output part 122A (step S215).

Subsequently, in a case where a certain time has elapsed (step S218/Yes), the control part 10A unlocks the lid's electromagnetic key (step S221).

Thereby, if a user is opening the garbage pickup box for disposing garbage, the garbage pickup box is locked and cannot be opened, and he/she receives a warning "Today is Wednesday. Garbage pickup days are Monday and Thursday. Saturday is for Unburnable garbage. Follow the garbage disposal rule." via display or voice when he/she hesitates for a moment. According to the present example, a user's operation (opening the lid) on the object of interest (garbage pickup box), or opening the lid of the garbage pickup box is restricted as an operation leading to an illegal action of disposing garbage on other than the predetermined days.

Thereafter, the garbage pickup box is unlocked and the lid can be opened, but the user is expected to stop illegally disposing garbage due to the warning. Alternatively, the user violates the rule this time, but he/she is expected to reflect on himself/herself due to the warning immediately before an illegal action and to follow the rule next time.

Additionally, the information processing apparatus 1A can recognize the contents of a garbage bag of a user by image analysis, and can confirm whether or not the user violates the rule on the basis of the sorting of garbage (such as sorting of burnable garbage, unburnable garbage, and recyclable garbage such as PET bottles, large garbage, and the like).

(Action Based on Rule Violation History)

Further, the information processing apparatus 1A according to the present example can give a warning to a person who has frequently violated the rule on the basis of the rule violation history of the residents. It will be specifically described below with reference to FIG. 7.

Figure 7:
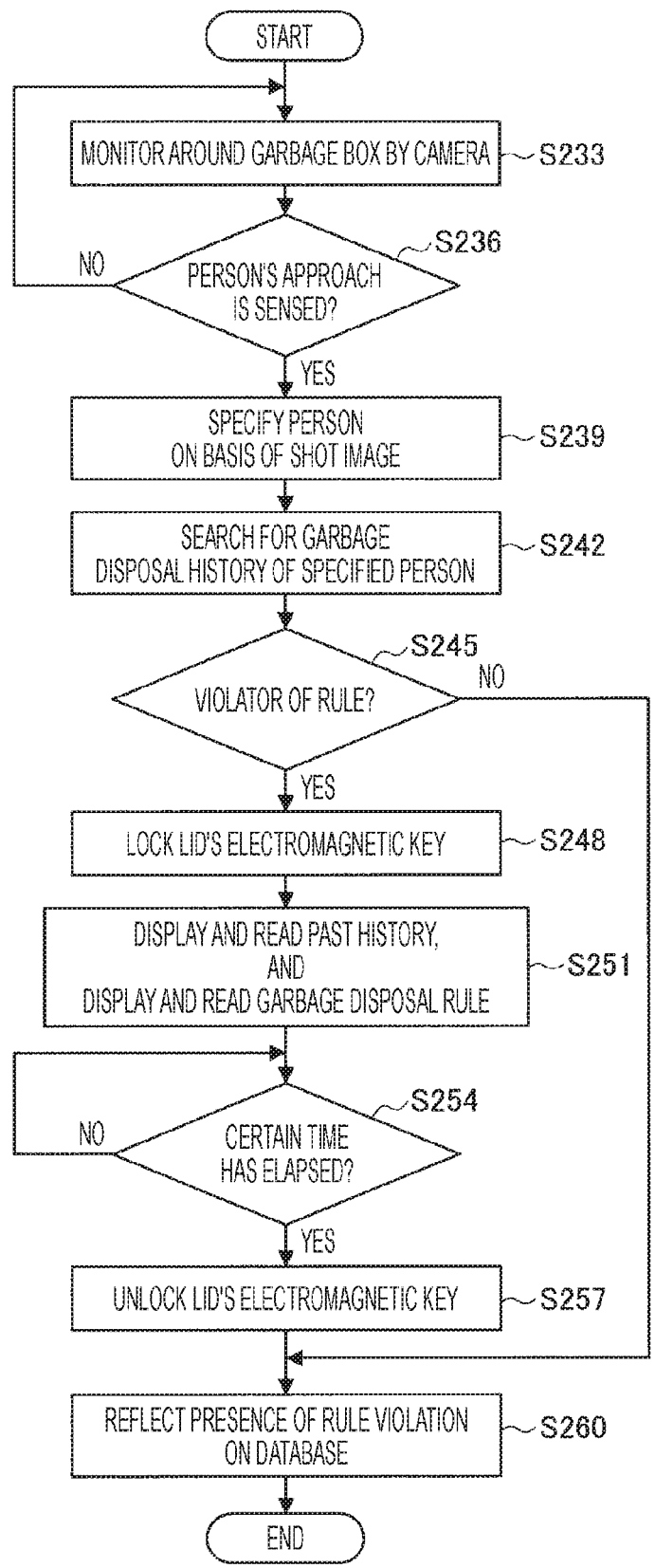
FIG. 7 is a flowchart illustrating other operation processings of the information processing apparatus (garbage pickup box) according to the first example.

FIG. 7 is a flowchart illustrating other operation processings of the information processing apparatus 1A according to the present example. As illustrated in FIG. 7, the information processing apparatus 1A first monitors around the garbage pickup box by the camera 111A (step S233), and specifies a person on the basis of a shot image (step S239) in a case where approach of the person is sensed (step S236/Yes). Specifically, the information processing apparatus 1A detects a face image by the face recognition part 1011A, and further specifies the person with reference to the face image database 141A.

The lid part opening/closing restriction part 1021A then searches for the garbage disposal history of the specified person from the garbage disposal history database 142A (step S242), and determines whether or not he/she is a violator of the rule (step S245). Whether or not he/she is a violator of the rule can be determined on the basis of whether or not he/she has violated the rule more than a predetermined number of times within a predetermined period, for example. Here, FIG. 8 illustrates an exemplary rule violation history stored in the garbage disposal history database 142A.

As illustrated in FIG. 8, a garbage disposal rule violation history is recorded per personal ID. A person who violated the rule within the past six months is determined as a violator of the rule by way of example here. In this case, the personal ID 00011 and the personal ID 00013 are determined as violators of the rule.

Then in a case where he/she is a violator of the rule (step S245/Yes), the information processing apparatus 1A locks the lid's electromagnetic key (step S248), and displays the past history or the garbage disposal rule on the display part 121A or/and outputs (reads) it by voice by the voice output part 122A (step S251). For example, the information processing apparatus 1A displays and outputs by voice "You were disposing garbage on other than garbage pickup days last week. Garbage pickup days are Monday and Thursday. Saturday is for Unburnable garbage. Follow the garbage disposal rule."

Subsequently, in a case where a certain time has elapsed (step S254/Yes), the control part 10A unlocks the lid's electromagnetic key (step S257).

The history management part 1031A then reflects the presence of rule violation on the garbage disposal history database 142A (step S260). The lid of the garbage pickup box is unlocked and the lid enters openable in step S257, and thus in a case where the user violates the rule also this time (an action of disposing garbage on other than the predetermined days), the action is stored as an illegal action in the history management part 1031A.

As described above, according to the first example, the lid of the garbage pickup box is not simply locked and a warning is given when it is temporarily locked so that the user is promoted to recall or learn the rule or to voluntarily follow the rule, thereby enhancing the prevention effect in the future.

Further, a warning is given against rule violation when a user approaches the garbage pickup box (approach is sensed) according to the above example, but the present example is not limited thereto, and a warning is given at the moment when a user is opening the lid of the garbage pickup box, thereby more effectively enhancing the prevention effect. Specifically, the information processing apparatus 1A senses the moment when a user touches the lid by the lid part touch sensor 112A, and gives a warning at the moment when the user who does not follow the rule touches (the handle of) the lid. Additionally, a "touch sensor" is used by way of example according to the present example, but the present embodiment is not limited thereto, and the moment when a user is touching (the handle of) the lid can be sensed by an approach sensor (non-touch sensor).

Further, the history management part 1031A may store the number of times of rule compliance. For example, in a case where a person follows the rule more than a predetermined number of times within a predetermined period, the person may be deleted from the rule violation history illustrated in FIG. 8.

Further, in the above example, the lid is locked and then unlocked after a certain time elapses, but the present example is not limited thereto, and the lid may be unlocked when it is confirmed that the user understands the warning. For example, the information processing apparatus 1A may unlock in a case where it acquires user's voice of affirmative response such as "Yes" or "OK" or in a case where the user presses the "YES" button (not illustrated) indicating that he/she understands the warning.

Further, the information processing apparatus 1A may notify a person who always behaves himself/herself (for example, a person at a certain rate or more of rule compliance in a case where the number of times of rule compliance is stored) of a positive message such as "Thank you for always following the rule".

3-2. Second Example

A second example of the present embodiment will be described below with reference to FIG. 9 to FIG. 12. The second example assumes that a refrigerator is restricted from being opened/closed thereby to enhance a dieting effect (to prevent overeating).

Figure 9:
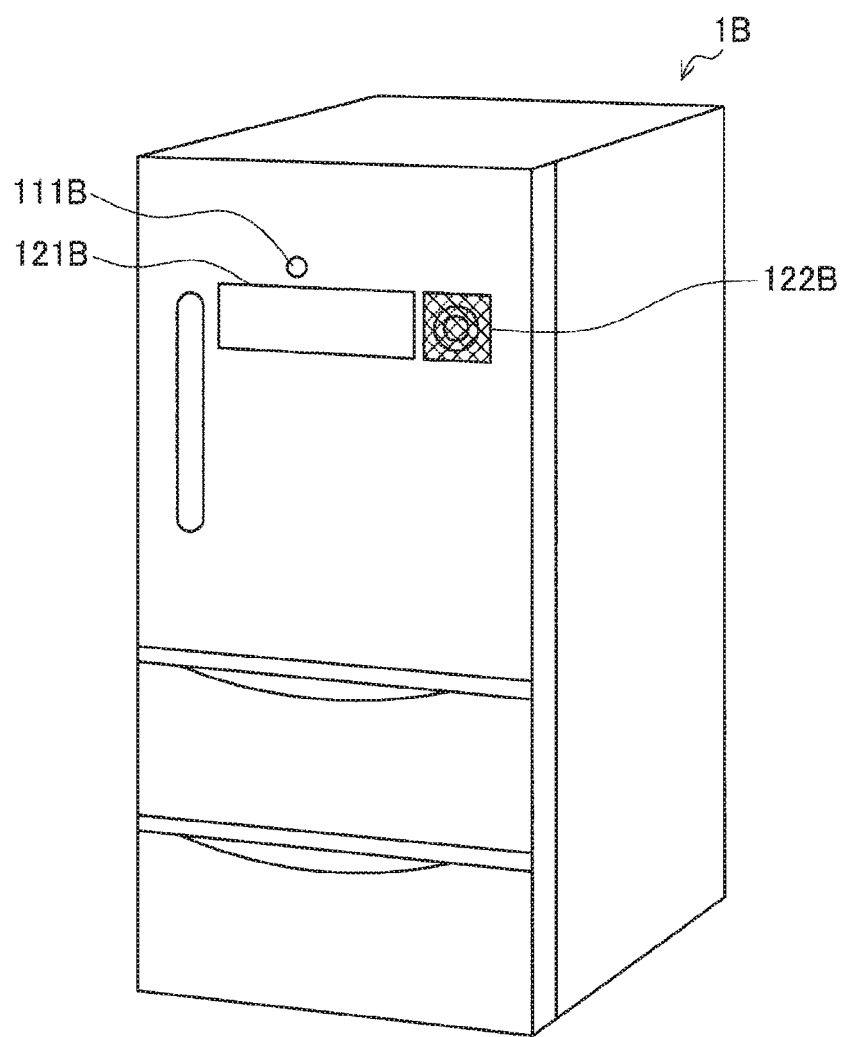
FIG. 9 is an external configuration diagram of an information processing apparatus (refrigerator) according to a second example.

FIG. 9 is an external configuration diagram of an information processing apparatus 1B (refrigerator) according to the present example. The information processing apparatus 1B (refrigerator) has a housing part for cooling and housing foods therein, and is provided with a camera 111B for capturing a person standing in front of the refrigerator as well as a display part 121B and a voice output part 122B for giving a warning on the door of the housing part as illustrated in FIG. 9.

The positions where the camera 111B, the display part 121B, and the voice output part 122B are installed are not particularly limited, but the camera 111B is installed at a position where it can shoot the face of a person who is opening the door, and the display part 121B is provided at a position within the field of view of a person who is opening the door, for example.

Figure 10:
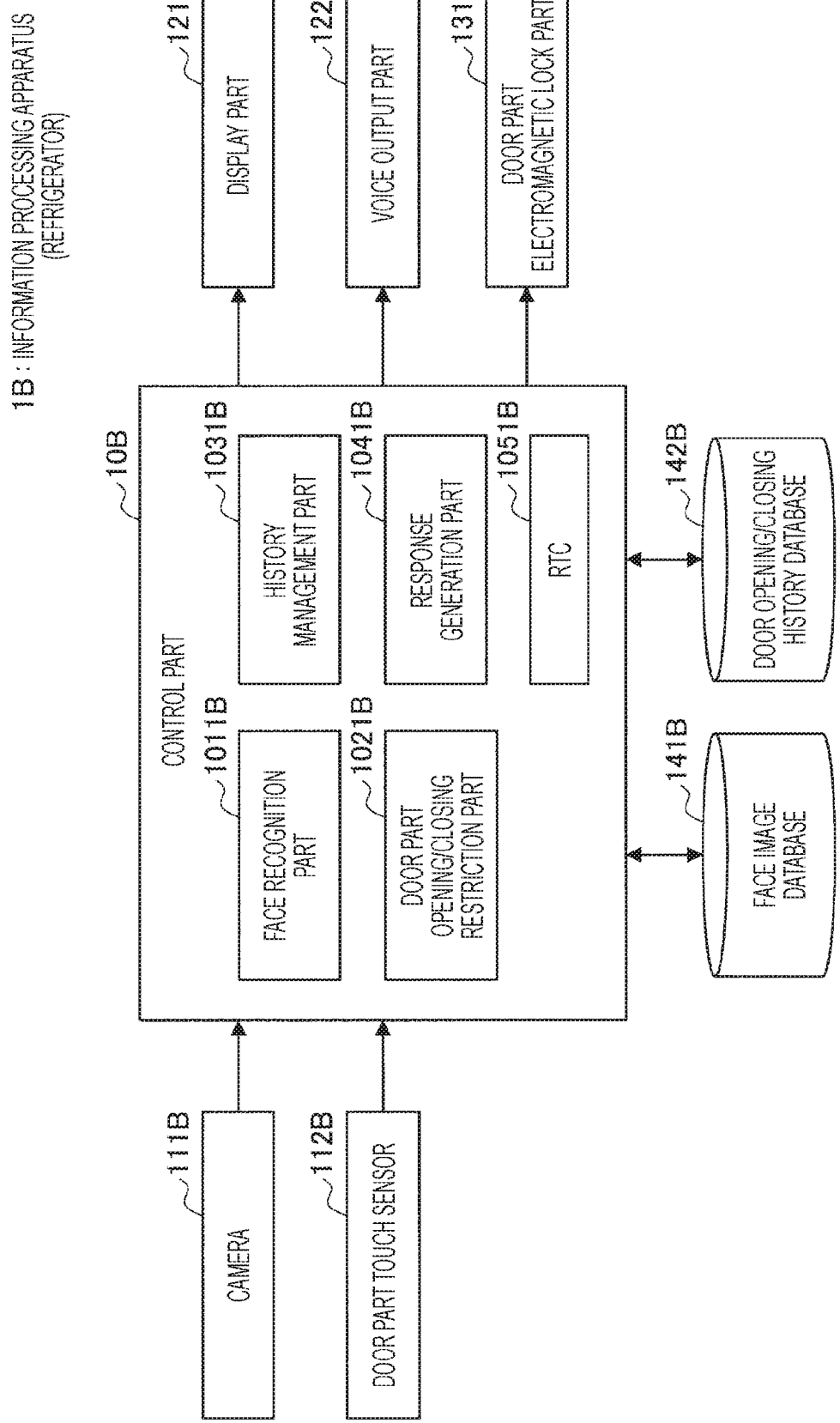
FIG. 10 is an internal configuration diagram of the information processing apparatus (refrigerator) according to the second example.

FIG. 10 is an internal configuration diagram of the information processing apparatus 1B (refrigerator) according to the present example. As illustrated in FIG. 10, the information processing apparatus 1B has a control part 10B, the camera 111B, a door part touch sensor 112B, the display part 121B, the voice output part 122B, a door part electromagnetic lock part 131B, a face image database 141B, and a door opening/closing history database 142B.

(Control Part 10B)

The control part 10B functions as a computation processing apparatus and a control apparatus, and controls the total operations in the information processing apparatus 1B according to various programs. The control part 10B is realized by an electronic circuit such as a central processing unit (CPU) or a microprocessor. Further, the control part 10B may include a read only memory (ROM) for storing programs, computation parameters, and the like to be used, and a random access memory (RAM) for temporarily storing parameters and the like changing as needed.

Further, the control part 10B according to the present embodiment also functions as a face recognition part 1011B, a door part opening/closing restriction part 1021B, a history management part 1031B, a response generation part 1041B, and a real-time clock (RTC) (also denoted as calendar clock) 1051B.

The face recognition part 1011B detects a face from an image shot by the camera 111B in the pattern matching method or the like for image analysis, and recognizes the detected face image. The detected face image is compared with the face images registered in the face image database 141B thereby to specify the person in the face recognition processing. The face images of the family members are previously registered in the face image database 141B, and, for example, the face recognition part 1011B calculates and compares the characteristic amounts of the face images thereby to specify the persons.

The door part opening/closing restriction part 1021B controls the door part electromagnetic lock part 131B of the refrigerator thereby to restrict opening/closing the door part.

The history management part 1031B, for example, saves and updates the information associated with opening/closing the door of the refrigerator of each user by use of the door opening/closing history database 142B. For example, the history management part 1031B records when and who opened the door. According to the present example, it can be estimated that a child takes out and eats any food when he/she opens the door of the refrigerator, and thus the door opening/closing history is recorded by way of example.

The response generation part 1041B generates response information such as warning to a user.

The RTC 1051B is a clock incorporated in the information processing apparatus 1B.

(Camera 111B)

The camera 111B has a lens system configured of a shooting lens, a diaphragm, a zoom lens, a focus lens, and the like, a drive system for causing the lens system to perform the focusing operation or the zooming operation, a solid-state shooting device array for photoelectrically converting a shooting light obtained in the lens system and generating a shooting signal, and the like. The solid-state shooting device array may be realized by a charge coupled device (CCD) sensor array or a complementary metal oxide semiconductor (CMOS) sensor array, for example. The camera 111B may be movable.

(Door Part Touch Sensor 112B)

The door part touch sensor 112B is provided on the door part of the information processing apparatus 1B, and senses user touch on the door part (specifically, such as the handle of the door part).

(Display Part 121B)

The display part 121B is a display apparatus for outputting warning display as response information generated by the response generation part 1041B. The display part 121B is provided at a position within the field of view of a user who is opening the door of the refrigerator, such as near the handle of the door part. Further, the display part 121B may be a display apparatus such as liquid crystal display (LCD) or organic electro luminescence (EL) display.

(Voice Output Part 122B)

The voice output part 122B has a speaker for reproducing a voice signal, and an amplifier circuit for the speaker.

(Door Part Electromagnetic Lock Part 131B)

The door part electromagnetic lock part 131B is realized by a mechanism for locking the door part depending on the conducting state. A specific mechanism of the electromagnetic lock part 131B is not particularly limited, but a lock mechanism of lock on conduction type (for example, mechanism for locking when the electromagnetic solenoid is powered on, and unlocking by a spring force. The lock function is disabled when powered off) may be employed. Further, the description has been made assuming that electromagnetic lock is used as an exemplary lock mechanism, but the present example is not limited thereto.

(Face Image Database 141B)

The face image information of the previously-registered users (for example, family members) of the refrigerator is registered in the face image database 141B. Further, the user information (such as personal ID and name) is registered in association with the face images in the face image database 141B.

(Door Opening/Closing History Database 142B)

The history information associated with door opening/closing of each user is stored in the door opening/closing history database 142B.

The configuration of the information processing apparatus 1B has been specifically described above. Additionally, the configuration of the information processing apparatus 1B is not limited to the example illustrated in FIG. 10, and may further have a communication part for connecting to a peripheral external apparatus or a network. Further, at least some of the components of the information processing apparatus 1B illustrated in FIG. 10 may be provided in an external apparatus to be connected to the information processing apparatus 1B for communication.

Further, a refrigerator itself is assumed as the information processing apparatus 1B according to the present example, but the present example is not limited thereto, and the information processing system may be configured such that the information processing apparatus 1B different from the refrigerator controls the door part electromagnetic lock part 131B of the refrigerator, or the display part 121B or the voice output part 122B provided on or around the refrigerator itself.

3-2-2. Operation Processings

Figure 11:
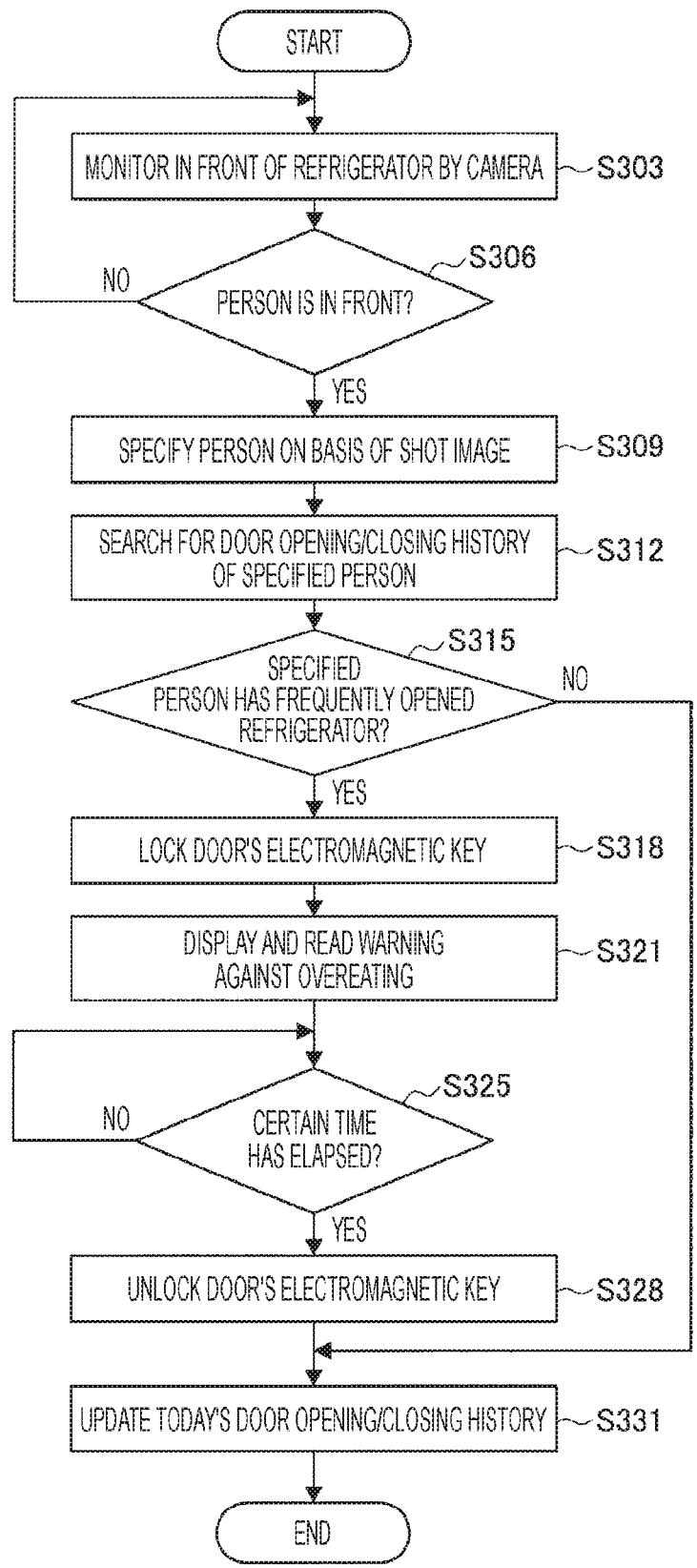
FIG. 11 is a flowchart illustrating operation processings of the information processing apparatus (refrigerator) according to the second example.

FIG. 11 is a flowchart illustrating the operation processings of the information processing apparatus 1B (refrigerator) according to the second example. As illustrated in FIG. 11, the information processing apparatus 1B first monitors around the refrigerator (corresponding to the information processing apparatus 1B, here) by the camera 111B (step S303).

Then in a case where a person standing in front of the door of the refrigerator is sensed (step S306/Yes), the person is specified on the basis of a shot image (step S309). Specifically, the information processing apparatus 1B detects a face image from the shot image by the face recognition part 1011B, and further specifies the person with reference to the face image database 141B.

The door part opening/closing restriction part 1021B then searches for the door opening/closing history of the specified person from the door opening/closing history database 142B (step S312), and determines whether or not the specified person has frequently opened the refrigerator (and may estimate the specified person as an overeater) (step S315). Whether or not the specified person has frequently opened the refrigerator can be determined on the basis of whether or not he/she has opened the door a predetermined number of times or more within a predetermined period, for example. Here, FIG. 12 illustrates an exemplary door opening/closing history stored in the door opening/closing history database 142B.

As illustrated in FIG. 12, the door opening/closing history is recorded per personal ID. Byway of example herein, a person who opened the door three times or more in the morning or afternoon in a day is determined as a person who has frequently opened the refrigerator (an overeater). In this case, the personal ID 00001 is determined as a person who has frequently opened the refrigerator.

Then in a case where the person has frequently opened the refrigerator (step S315/Yes), the information processing apparatus 1B locks the door's electromagnetic key (step S318), and displays a warning against overeating on the display part 121B, or/and outputs (reads) it by voice by the voice output part 122B (step S321). For example, the information processing apparatus 1B displays and outputs by voice "You opened the refrigerator three times in the afternoon today. Eat less sweets."

Subsequently, in a case where a certain time has elapsed (step S325/Yes), the control part 10B unlocks the door's electromagnetic key (step S328).

The history management part 1031B then reflects the today's door opening/closing history on the door opening/closing history database 142B (step S331). The door of the refrigerator is unlocked and the door enters openable in step S328, and thus in a case where the user ignores the advice and violates the rule also this time (opens the refrigerator the number of times determined by a parent or more, for example), the action is stored as a rule violation action by the history management part 1031B.

As described above, according to the second example, the door of the refrigerator is not simply locked and a warning is given while the door is temporarily locked so that the user is promoted to know that he/she has opened the door many times and to pay attention to overeating.

Further, in the above example, a warning is given while a user is standing in front of the refrigerator (approach is sensed), but the present example is not limited thereto, and a warning is given at the moment when a user is opening the door of the refrigerator, thereby more effectively enhancing the prevention effect. Specifically, the information processing apparatus 1B senses the moment when a user touches (the handle of) the door by the door part touch sensor 112B, and gives a warning at the moment when the user who has frequently opened the refrigerator touches the door. Additionally, a "touch sensor" is used by way of example according to the present example, but the present embodiment is not limited thereto, and an approach sensor (non-touch sensor) can sense the moment when a user is touching (the handle of) the door.

Further, the information processing apparatus 1B may recognize an object which a user takes out of the refrigerator by image analysis, store the number of times of taking out sweets, and give a warning in a case where the user has frequently taken out the sweets.

Further, in the above example, the door is locked and then unlocked after a certain time elapses, but the present example is not limited thereto and the door may be unlocked when it is confirmed that the user understands the warning. For example, in a case where the voice input part (not illustrated) acquires user's voice of affirmative response such as "Yes" or "OK" or in a case where the user presses the "YES" button (not illustrated) indicating that he/she understands the warning, the information processing apparatus 1B may unlock.

3-3. Third Example

A third example of the present embodiment will be described below with reference to FIG. 13 to FIG. 15. Prevention of traffic rule violation during automobile driving will be described according to the third embodiment (an automobile is used as an exemplary moving object according to the present example). The traffic rule violation includes illegal actions such as ignoring temporary stop, ignoring a red light, driving after drinking, calling with driving communication part in hand, not-wearing the seat belt, changing lanes without direction indicator, excessive speed, sudden acceleration/sudden starting, inter-vehicle distance, looking away, and long-time driving, and dangerous driving. Prevention of "excessive speed" will be described by way of example according to the present example.

Figure 13:
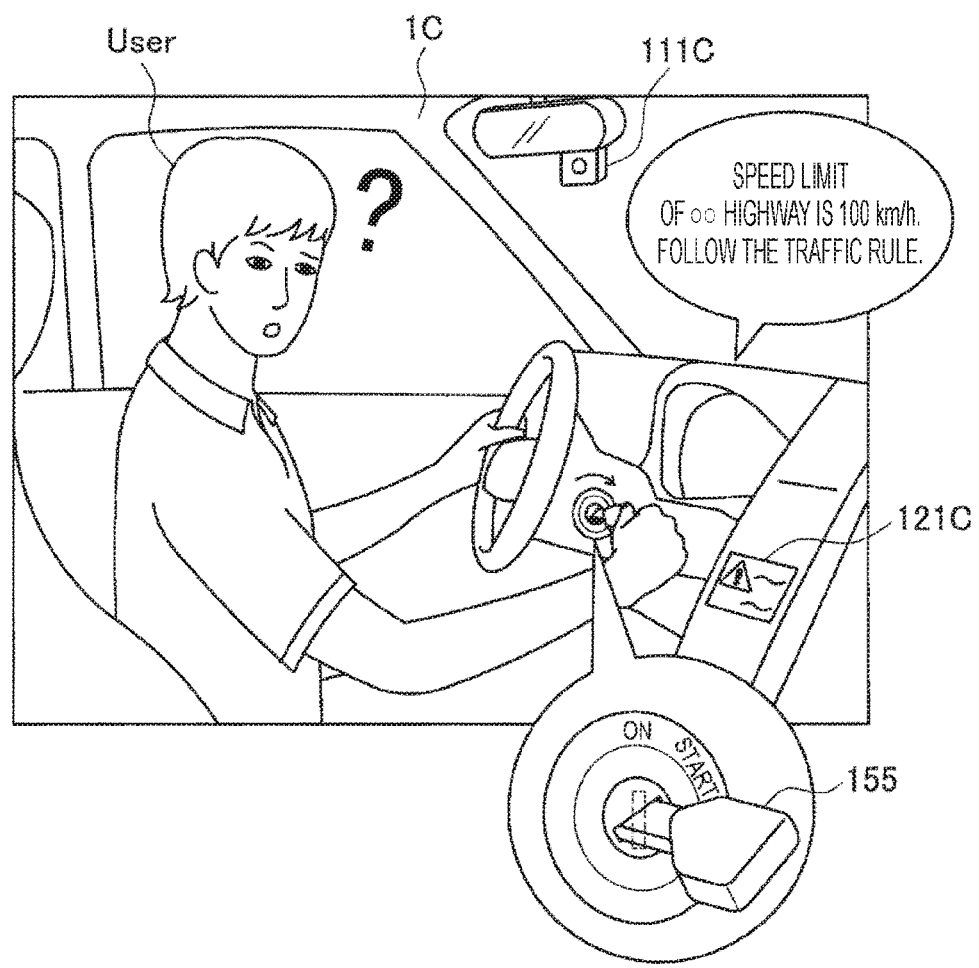
FIG. 13 is a diagram for explaining an outline of a third example.

FIG. 13 is a diagram for explaining an outline of the third example. As illustrated in FIG. 13, an information processing apparatus 1C (automobile in the present example) recognizes a user who is seated on the driver's seat by a vehicle-mounted camera 111C, and temporarily locks the engine startup operation and gives a warning in a case where he/she has frequently violated the speed limit.

For example, when the user is turning the ignition key 155 to start up the engine, the information processing apparatus 1C locks the ignition key 155 not to turn to the START position, or not to ignite even if it is turned to the START position.

When the user hesitates for a moment since the engine is not started up, the information processing apparatus 1C gives a warning to follow the traffic rule. For example, in a case where the user has always violated the speed limit at the same place, a warning "Speed limit of 00 highway is 100 km/h. Follow the traffic rule" is given by voice or display (a display part 121C illustrated in FIG. 13).

The information processing apparatus 1C then unlocks the engine startup after giving the warning, and performs the engine startup operation as usual.

In this way, according to the present example, the engine startup operation is restricted and a warning is given to the user immediately before the start of driving to promote to follow the traffic rule, thereby more effectively preventing the traffic rule violation.

3-3-1. Configuration

Figure 14:
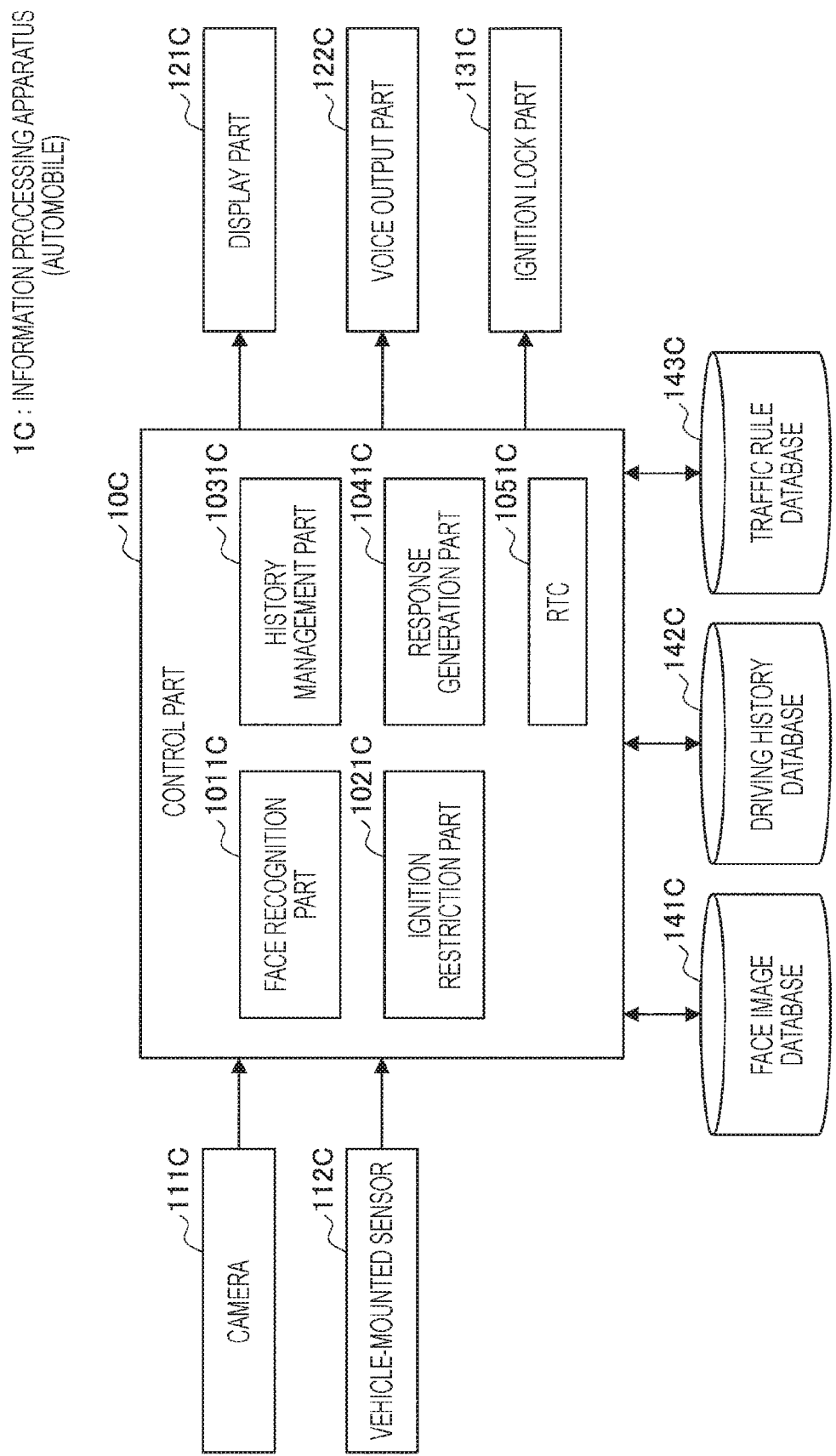
FIG. 14 is an internal configuration diagram of an information processing apparatus (automobile) according to the third example.

FIG. 14 is an internal configuration diagram of the information processing apparatus 1C (automobile) according to the present example. As illustrated in FIG. 14, the information processing apparatus 1C has a control part 10C, the camera 111C, a vehicle-mounted sensor 112C, the display part 121C, a voice output part 122C, an ignition lock part 131C, a face image database 141C, a driving history database 142C, and a traffic rule database 143C.

(Control Part 10C)

The control part 10C functions as a computation processing apparatus and a control apparatus, and controls the total operations in the information processing apparatus 1C according to various programs. The control part 10C is realized by an electronic circuit such as a central processing unit (CPU) or a microprocessor. Further, the control part 10C may include a read only memory (ROM) for storing programs, computation parameters, and the like to be used, and a random access memory (RAM) for temporarily storing parameters and the like changing as needed.

Further, the control part 10C according to the present embodiment also functions as a face recognition part 1011C, an ignition restriction part 1021C, a history management part 1031C, a response generation part 1041C, and a real-time clock (RTC) (also denoted as calendar clock) 1051C.

The face recognition part 1011C detects a face from an image shot by the camera 111C in the pattern matching method or the like for image analysis, and recognizes the detected face image. The detected face image is compared with the face images registered in the face image database 141C thereby to specify the person in the face recognition processing. The face images of the drivers are previously registered in the face image database 141C, and the face recognition part 1011C calculates and compares the characteristic amounts of the face images thereby to specify the persons.

The ignition restriction part 1021C controls the ignition lock part 131C thereby to restrict the ignition operation (and the engine startup operation).

The history management part 1031C, for example, saves and updates the information associated with driving of each user by use of the driving history database 142C. For example, the history management part 1031C records when and where the traffic rule is violated.

The response generation part 1041C generates response information such as rule notification or warning to the user.

The RTC 1051C is a clock incorporated in the information processing apparatus 1C.

(Camera 111C)

The camera 111C has a lens system configured of a shooting lens, a diaphragm, a zoom lens, a focus lens, and the like, a drive system for causing the lens system to perform the focusing operation or the zooming operation, a solid-state shooting device array for photoelectrically converting a shooting light obtained in the lens system and generating a shooting signal, and the like. The solid-state shooting device array may be realized by a charge coupled device (CCD) sensor array or a complementary metal oxide semiconductor (CMOS) sensor array, for example. The camera 111C may be movable.

Further, the position where the camera 111C is installed is not limited to the example illustrated in FIG. 13 (on the room mirror), and the camera 111C may be provided at a position where it can shoot the face of a driver.

(Vehicle-Mounted Sensor 112C)

The vehicle-mounted sensor 112C includes various sensors mounted on the automobile. For example, the vehicle-mounted sensor 112C includes a positioning part, a speed sensing part, or the like.

(Display Part 121C)

The display part 121C is a display apparatus for outputting rule display or warning display as response information generated by the response generation part 1041C. The display part 121C is provided at a position within the field of view of the driver, such as around the driver's seat. Further, the display part 121C may be a display apparatus such as liquid crystal display (LCD) or organic electro luminescence (EL) display.

(Voice Output Part 122C)

The voice output part 122C has a speaker for reproducing a voice signal, and an amplifier circuit for the speaker.

(Ignition Lock Part 131C)

The ignition lock part 131C restricts the ignition operation. For example, the ignition key (or the startup key of a moving object (such as automobile)) is locked not to turn to the START position (ignition position), or not to ignite even if it is turned to the START position. Alternatively, the ignition switch (of push-type or the like) is locked not to be pressed, or not to ignite even if it is pressed.

(Face Image Database 141C)

The face image information of the previously-registered users (drivers) is registered in the face image database 141C. Further, the user information (such as personal ID, age, and name) may be registered in association with the face images in the face image database 141C.

(Driving History Database 142C)

The history information associated with driving of each user is stored in the driving history database 142C. For example, when and where the traffic rule was violated is recorded in the driving history database 142C. According to the present example, where and when the speed limit was violated (the driver traveled over the legal speed) is recorded by way of example.

(Traffic Rule Database 143C)

The information associated with the traffic rule is stored in the traffic rule database 143C.

The configuration of the information processing apparatus 1C has been specifically described above. Additionally, the configuration of the information processing apparatus 1C is not limited to the example illustrated in FIG. 14, and can further have a communication part for connecting to a peripheral external apparatus or a network. Further, at least some of the components of the information processing apparatus 1C illustrated in FIG. 14 may be provided in an external apparatus to be connected to the information processing apparatus 1C for communication.

Further, an automobile itself is assumed as the information processing apparatus 1C according to the present example, but the present example is not limited thereto, and the information processing system may be configured such that the information processing apparatus 1C different from the automobile controls the ignition lock part 131C, the display part 121C, or the voice output part 122C.

3-3-2. Operation Processings

Figure 15:
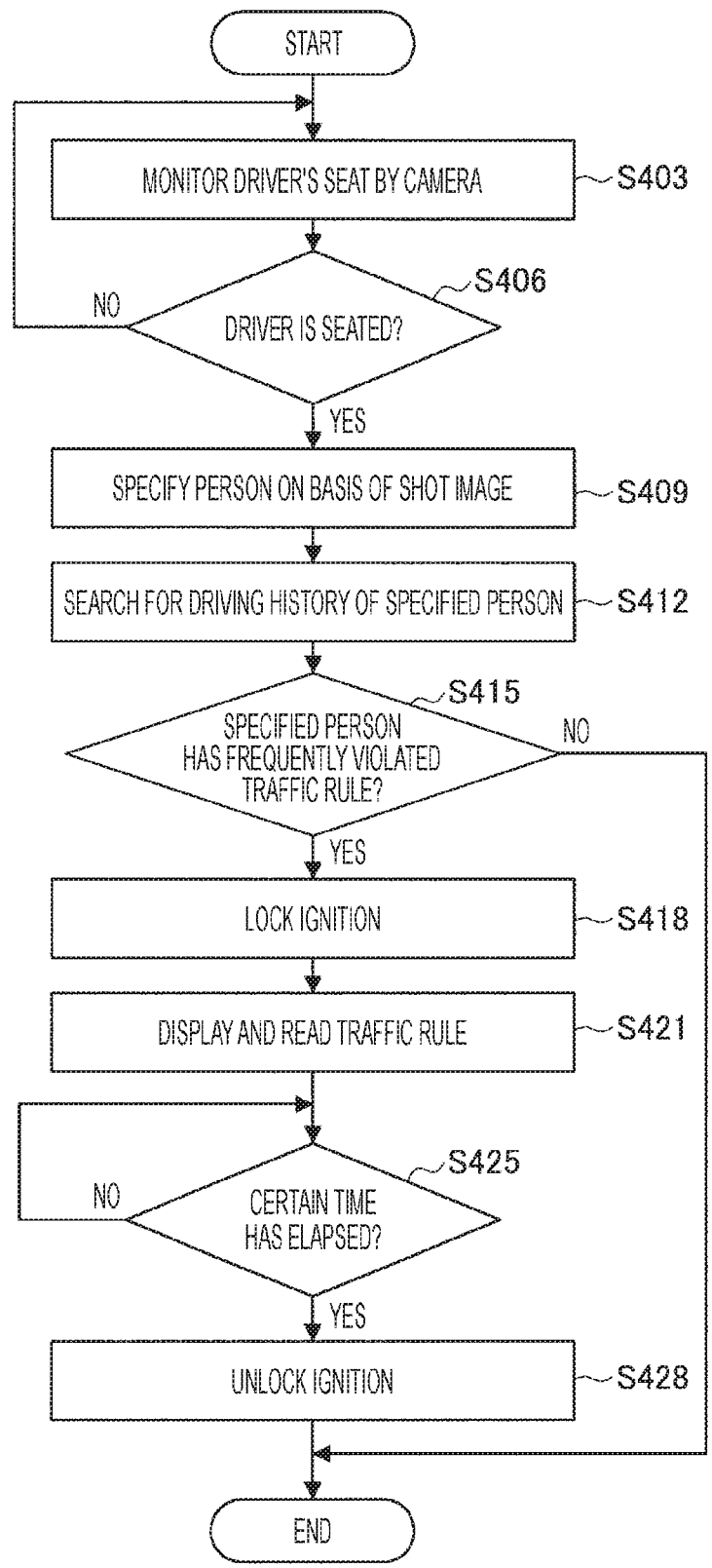
FIG. 15 is a flowchart illustrating operation processings of the information processing apparatus (automobile) according to the third example.

FIG. 15 is a flowchart illustrating the operation processings of the information processing apparatus 1C (automobile) according to the third example. As illustrated in FIG. 15, the information processing apparatus 1C first monitors the driver's seat by the camera 111C (step S403).

Then, in a case where a person who is seated on the driver's seat is sensed (step S406/Yes), the person is specified on the basis of a shot image (step 409). Specifically, the face recognition part 1011C in the information processing apparatus 1C detects a face image from the shot image and further specifies the person with reference to the face image database 141C.

The ignition restriction part 1021C then searches for the driving history of the specified person from the driving history database 142C (step S412), and determines whether or not the specified person has frequently violated the traffic rule (step S415). Whether or not the specified person has frequently violated the traffic rule can be determined on the basis of whether or not he/she has violated the traffic rule a predetermined number of times or more within a predetermined period, for example. When and where an excessive speed was sensed is recorded per personal ID, for example, in the driving history database 142C. Here, a person who has violated the speed limit a predetermined number of times or more at the same place is determined as a person which has frequently violated the traffic rule by way of example.

Then, in a case where the specified person has frequently violated the traffic rule (step S415/Yes), the information processing apparatus 1C locks the ignition (or the engine cannot be started up) (step S418), and displays the traffic rule and a warning by the display part 121C, or/and outputs (reads) them by voice by the voice output part 122B (step S421). For example, the information processing apparatus 1C displays and outputs by voice "Your speeding violation has been frequently sensed on 00 highway. Speed limit of 00 highway is 100 Km/h. Follow the traffic rule."

Subsequently, in a case where a certain time has elapsed (step S425/Yes), the control part 10C unlocks the ignition (or the engine can be started up) (step S428).

As described above, according to the third example, the ignition is not simply locked and a warning is given while the ignition is temporarily locked, thereby causing the user to recall or learn the traffic rule and enhancing the traffic rule violation prevention effect.

Additionally, the history management part 1031C reflects the driving history on the driving history database 142C on the basis of the information acquired from the vehicle-mounted sensor 112C or the camera 111C while the user is driving.

Further, the user is given a warning when he/she sits on the driver's seat in the above example, but the present example is not limited thereto, and a warning is given to the user when he/she is staring up the engine, thereby more effectively enhancing the prevention effect. Specifically, the information processing apparatus 1C senses the ignition key or senses the moment when the user touches the ignition switch, and locks the ignition and gives a warning at the moment when the user is starting up the engine.

Further, in the above example, the ignition is locked and then unlocked when a certain time elapses, but the present example is not limited thereto, and the ignition may be unlocked when it is confirmed that the user understands the warning. For example, in a case where the voice input part (not illustrated) acquires user's voice of affirmative response such as "Yes" or "OK" or in a case where the user presses the "YES" button (not illustrated) indicating that he/she understands the warning, the information processing apparatus 1C may unlock the ignition.

3-4. Supplements

3-4-1. System Configuration

The information processing apparatus 1 according to the present embodiment may be realized in a system configuration including an information processing terminal and a server.

Figure 16:
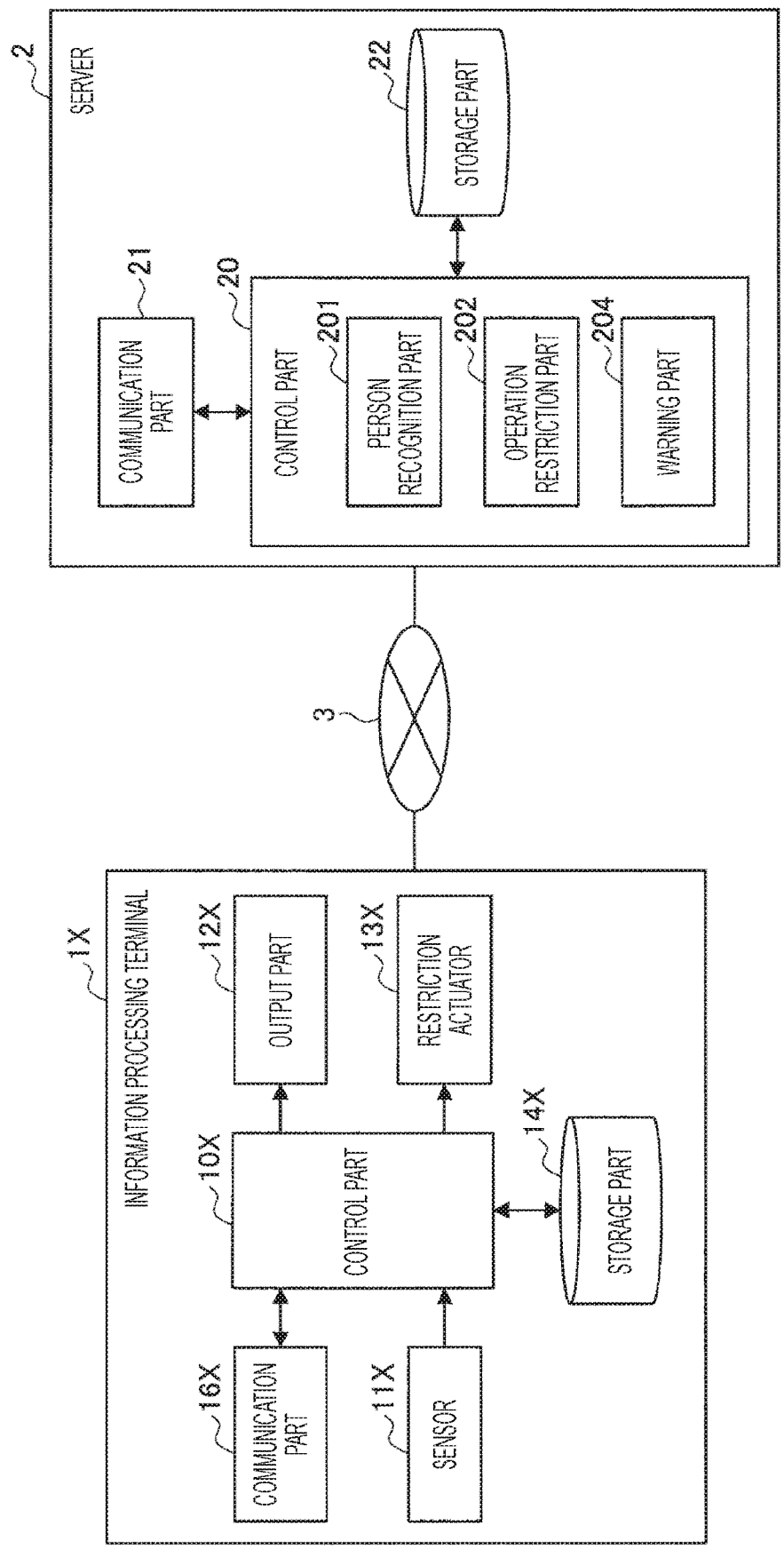
FIG. 16 is a diagram illustrating an exemplary system configuration of the present embodiment.

Here, FIG. 16 illustrates an exemplary system configuration according to the present embodiment. As illustrated in FIG. 16, the information processing system according to the present embodiment includes an information processing terminal 1X and a server 2. The information processing terminal 1X and the server 2 are connected to each other via a network 3, and exchange data.

(Configuration of Information Processing Terminal 1X)

The information processing terminal 1X has a control part 10X, a sensor 11X, an output part 12X, a restriction actuator 13X, a storage part 14X, and a communication part 16X.

The control part 10X functions as a computation processing apparatus and a control apparatus, and controls the total operations in the information processing terminal 1X according to various programs. The control part 10X is realized by an electronic circuit such as a central processing unit (CPU) or a microprocessor. Further, the control part 10X may include a read only memory (ROM) for storing programs, computation parameters, and the like to be used, and a random access memory (RAM) for temporarily storing parameters and the like changing as needed.

For example, the control part 10X restricts an operation on an object of interest by the restriction actuator 13X according to an instruction received from the server 2 via the communication part 16X, and controls outputting warning information from the output part 12X.

The sensor 11X senses various items of information, and outputs the sensed information (sensor data) to the control part 10X. The sensor 11X can be realized by a camera, a voice input part (microphone), a human-presence sensor, a biometric sensor (sensor for pulse, vein, heartbeat, blood pressure, body temperature, sweating, breathing, myoelectric value, brain waves, or the like), a motion sensor (acceleration sensor, gyro sensor, geomagnetism sensor, or the like), an opening/closing sensor, an environment sensor (sensor for temperature, humidity, illuminance, rain, wind, or the like), a positioning part, or the like.

The output part 12X outputs a warning to the user under control of the control part 10X. The output part 12X can be realized by a voice output part (speaker), a display part, a projection part, or the like.

The restriction actuator 13X has a mechanism for restricting an operation on an object of interest under control of the control part 10X, and substantially restricting a user's operation on the object of interest leading to an illegal action.

The storage part 14X is realized by a read only memory (ROM) for storing programs, computation parameters, and the like used for the processings of the control part 10X, and a random access memory (RAM) for temporarily storing parameters and the like changing as needed.

The communication part 16X is connected to an external apparatus (for example, peripheral device, router, base station, server, or the like) in a wired or wireless manner thereby to exchange data therewith. Specifically, the communication part 16X is connected to the network 3 to exchange data with the server 2, for example. Further, the communication part 16X is connected to an external apparatus for communication via wired/wireless local area network (LAN), Wi-Fi (registered trademark), Bluetooth (registered trademark), infrared communication, long term evolution (LTE), third-generation mobile communication system (3G), or the like.

(Configuration of Server 2)

The server 2 has a control part 20, a communication part 21, and a storage part 22.

The control part 20 functions as a computation processing apparatus and a control apparatus, and controls the total operations in the server 2 according to various programs. The control part 20 is realized by an electronic circuit such as a central processing unit (CPU) or a microprocessor. Further, the control part 20 may include a read only memory (ROM) for storing programs, computation parameters, and the like to be used, and a random access memory (RAM) for temporarily storing parameters and the like changing as needed.

Further, the control part 20 also functions as a person recognition part 201, an operation restriction part 202, and a warning part 204.

The person recognition part 201 recognizes a person present around an object of interest (for example, the information processing terminal 1X) on the basis of the sensor data (for example, shot image, voice information, or the like) transmitted from the information processing terminal 1X.

In a case where the person recognition part 101 detects a person who is likely to violate a predetermined rule after operating the object of interest, the operation restriction part 202 restricts the operation on the object of interest. Specifically, the operation restriction part 202 transmits an operation restriction instruction from the communication part 21 to the information processing terminal 1X.

When the operation restriction part 202 restricts the operation, the warning part 204 controls giving a warning to follow the predetermined rule from the information processing terminal 1X. Specifically, the warning part 204 transmits warning information from the communication part 21 to the information processing terminal 1X.

The communication part 16X is connected to an external apparatus in a wired or wireless manner thereby to exchange data therewith. Specifically, the communication part 16X is connected to the network 3 thereby to exchange data with the information processing terminal 1X, for example. Further, the communication part 16X is connected to an external apparatus for communication via wired/wireless local area network (LAN), Wi-Fi (registered trademark), or the like.

The storage part 22 is realized by a read only memory (ROM) for storing programs, computation parameters, and the like used for the processings of the control part 20, and a random access memory (RAM) for temporarily storing parameters and the like changing as needed. For example, the storage part 22 stores a face image database of each user, a predetermined rule database, or the like.

The exemplary configuration of the information processing system has been specifically described above. Additionally, the system configuration illustrated in FIG. 16 is exemplary, and the present embodiment is not limited thereto. For example, at least some of the components of the server 2 may be in an external apparatus, and at least some of the function units in the control part 20 may be realized by the information processing terminal 1X or other information processing terminal (for example, so-called edge server, or the like) relatively close in communication distance to the information processing terminal 1X. The components in the server 2 are dispersed as needed in this way, thereby enhancing the real-time performance, alleviating the processing loads, and further achieving the security.

3-4-2. Applications

Operation restriction on an object of interest has been described according to each example by way of the lid part opening/closing restriction of a garbage pickup box, the door opening/closing restriction of a refrigerator, and the ignition operation restriction of an automobile, but the present embodiment is not limited thereto.

For example, in a case where the sound volume level (volume value) has exceeded a predetermined value in many cases on the basis of the history of the sound volume level of the music player, the information processing apparatus 1 restricts the reproduction operation and gives a waring of sound volume adjustment. For example, when the user is reproducing music, the information processing apparatus 1 does not reproduce it, displays or outputs by voice a warning "Sound volume is always high. High sound volume is not good for ears, and we recommend volume ∘∘ (appropriate sound volume level)" or the like, and then starts reproducing music. The recommended appropriate sound volume level is set at a numerical value in consideration of sound leaking in public places, and thus the manners to use can be followed.

In a case where a user is to be specified, biometric authentication (for example, fingerprint authentication) is performed by use of the input information on log-in or a biometric sensor provided on a power supply switch or the like, and the user can be recognized with reference to the user information.

Further, in a case where a user smiles or says hello less than a predetermined number of times on the basis of the history of user's smiling or saying hello, the information processing apparatus 1 may temporarily restricts opening/closing the front door, for example, and may tell "Smile more", "Say hello", or the like. In this case, the information processing apparatus 1 may unlock the front door when a certain time elapses after telling it, or may unlock when smiling or saying hello is sensed.

Further, in a case where the number of times of shopping or the spending is higher than a predetermined value on the basis of the use's spending history (in a case where wasteful spending or its frequency is higher than a predetermined value when wasteful spending can be determined), the information processing apparatus 1 may temporarily restrict the payment processing when the user is paying, and may display/output by voice a warning message (for example, "You already used ∘∘ yen this month. Attention to wasteful spending!" or the like) and then enable the payment. Payment with an IC card, Internet shopping, payment with electronic money, and the like are assumed.

4. CONCLUSION

As described above, in the information processing system according to the embodiment of the present disclosure, an operation leading to an illegal action is restricted thereby to enhance the illegal action prevention effect.

The preferred embodiment of the present disclosure has been described above in detail with reference to the accompanying drawings, but the present technology is not limited to the examples. It is clear to those skilled in the art in the technical field of the present disclosure that various changes or modifications can be assumed within the scope of the technical spirit described in CLAIMS and these of course belong to the technical scope of the present disclosure.

For example, a computer program for causing the hardware such as CPU, ROM, and RAM incorporated in the information processing apparatus 1 (1A to 1C), the information processing terminal 1X, or the server 2 to fulfill the functions of the information processing apparatus 1 (1A to 1C), the information processing terminal 1X, or the server 2 can be created. Further, a computer readable storage medium storing the computer program therein is also provided.

Further, the effects described in the present specification are merely explanatory or exemplary, and are not restrictive. That is, the technology according to the present disclosure can produce other effect clear to those skilled in the art from the description of the present specification together with the above effects or instead of the above effects.

Additionally, the present technology can take the following configurations.

(1)
An information processing apparatus including:
a sensor data acquisition part configured to acquire sensor data output from a sensor; and
a control part configured to restrict an operation on an object of interest when detecting a person who is likely to violate a predetermined rule after operating the object of interest on the basis of the sensor data, and to remove the restriction of the operation on the object of interest after giving a warning on the basis of the predetermined rule via a notification part.

(2)
The information processing apparatus according to (1),
in which when detecting a person who approaches the object of interest on the basis of the sensor data and acquiring information on which the estimation that the detected person is likely to violate a predetermined rule after operating the object of interest is based,
the control part restricts an operation on the object of interest, gives a warning to follow the predetermined rule via the notification part, and then removes the restriction of the operation on the object of interest.

(3)
The information processing apparatus according to (2),
in which the information on which the estimation that the predetermined rule is likely to be violated is based is a past action history of the detected person or a current time/date.

(4)

The information processing apparatus according to (2) or (3),
- in which when estimating that the detected person is likely to violate a predetermined rule after opening an opening/closing part of a housing part,
- the control part locks the opening/closing part of the housing part, gives a warning to follow the predetermined rule via the notification part, and then unlocks the opening/closing part of the housing part.

(5)

The information processing apparatus according to any one of (2) to (4),
- in which when specifying a person who approaches the object of interest on the basis of the sensor data, and
- estimating that the person is likely to violate a predetermined rule after operating the object of interest from a past action history of the specified person,
- the control part restricts an operation on the object of interest, gives a warning to follow the predetermined rule via the notification part, and then removes the restriction of the operation on the object of interest.

(6)

The information processing apparatus according to any one of (2) to (5),
- in which when specifying a person who approaches a housing part on the basis of the sensor data, and
- estimating that the person is likely to violate a predetermined rule after opening an opening/closing part of the housing part from a past action history of the specified person,
- the control part locks the opening/closing part of the housing part, gives a warning to follow the predetermined rule via the notification part, and then unlocks the opening/closing part of the housing part.

(7)

The information processing apparatus according to any one of (2) to (6),
- in which the object of interest is a garbage pickup box, and
- when detecting a person who approaches the garbage pickup box and estimating that the person is likely to violate a garbage disposal rule after opening a lid part of the garbage pickup box,
- the control part locks the lid part of the garbage pickup box, gives a warning to follow the garbage disposal rule via the notification part, and then unlocks the lid part of the garbage pickup box.

(8)

The information processing apparatus according to (7),
- in which the control part estimates whether or not the detected person is likely to violate a garbage disposal rule after opening the lid part of the garbage pickup box on the basis of a current time/date and a garbage disposal time/date defined in the garbage disposal rule.

(9)

The information processing apparatus according to (7),
- in which the control part specifies the detected person, and estimates whether or not the person is likely to violate a garbage disposal rule after opening the lid part of the garbage pickup box on the basis of a past garbage disposal rule violation history of the specified person.

(10)

The information processing apparatus according to any one of (2) to (6),
- in which the object of interest is a refrigerator, and
- when detecting a person who approaches the refrigerator and estimating that the person is likely to overeat after opening a door part of the refrigerator,
- the control part locks the door part of the refrigerator, gives a warning against overeating via the notification part, and then unlocks the door part of the refrigerator.

(11)

The information processing apparatus according to (10),
- in which the control part specifies the detected person, and estimates whether or not the person is likely to overeat on the basis of a past door opening/closing history of the specified person.

(12)

The information processing apparatus according to any one of (2) to (5),
- in which the object of interest is a moving object, and
- when specifying a person who starts up the moving object on the basis of the sensor data, and
- estimating that the person is likely to violate a predetermined rule after starting up the moving object from a past action history of the specified person,
- the control part restricts starting up the moving object, gives a warning to follow the predetermined rule via the notification part, and then removes the restriction of the startup of the moving object.

(13)

The information processing apparatus according to (12),
- in which the control part restricts a physical operation on a startup key, a button, or a switch, or restricts an engine ignition operation as restriction of the startup of the moving object.

(14)

The information processing apparatus according to (12) or (13),
- in which the control part specifies a person who drives an automobile as the moving object, and estimates whether or not the person is likely to violate a traffic rule after starting driving on the basis of a past traffic rule violation history of the specified person.

(15)

The information processing apparatus according to any one of (2) to (14),
- in which when detecting that a hand of the person approaches the object of interest on the basis of the sensor data, the control part gives a warning for the person who is likely to violate a predetermined rule after operating the object of interest.

(16)

The information processing apparatus according to (2) or (3),
- in which the object of interest is a music player, and
- when specifying a person who starts up the music player on the basis of the sensor data, and
- estimating that the person is likely to listen to music at a sound volume exceeding a predetermined value after reproducing music in the music player from a past sound volume adjustment history of the specified person,
- the control part restricts the reproduction operation of the music player, gives a warning to listen at an appropriate sound volume via the notification part, and then removes the restriction of the reproduction operation of the music player.

(17)

An information processing method by a processor, including:
  acquiring sensor data output from a sensor; and
  restricting an operation on an object of interest when detecting a person who is likely to violate a predetermined rule after operating the object of interest on the basis of the sensor data, and removing the restriction of the operation on the object of interest after giving a warning on the basis of the predetermined rule via a notification part.

(18)

A computer readable storage medium storing a program therein, the program for causing a computer to function as:
  a sensor data acquisition part configured to acquire sensor data output from a sensor; and
  a control part configured to restrict an operation on an object of interest when detecting a person who is likely to violate a predetermined rule after operating the object of interest on the basis of the sensor data, and to remove the restriction of the operation on the object of interest after giving a warning on the basis of the predetermined rule via a notification part.

REFERENCE SIGNS LIST 1, 1A, 1B, 1C Information processing apparatus
1X Information processing terminal
2 Server
3 Network
10, 10A, 10B, 10C, 10X Control part
11, 11X Sensor
12, 12X Output part
13, 13X Restriction actuator
14, 14X Storage part
16X Communication part
20 Control part
21 Communication part
22 Storage part
101 Person recognition part
102 Operation restriction part
104 Warning part
111, 111A, 111B, 111C Camera
112A Lid part touch sensor
112B Door part touch sensor
112C Vehicle-mounted sensor
113 Voice input part
114 Operation input part
121, 121A, 121B, 121C Display part
122, 122A, 122B, 122C Voice output part
131A Lid part electromagnetic lock part
131B Door part electromagnetic lock part
131C Ignition lock part
141A, 141B, 141C Face image database
142A Garbage disposal history database
142B Door opening/closing history database
142C Driving history database
143A Garbage disposal rule database
143C Traffic rule database
151 Lid part
155 Ignition key
201 Person recognition part
202 Operation restriction part
204 Warning part
1011A, 1011B, 1011C Face recognition part
1021A Lid part opening/closing restriction part
1021B Door part opening/closing restriction part
1021C Ignition restriction part
1031, 1031A 1031B, 1031C History management part
1041A, 1041B, 1041C Response generation part
1051A, 1051B, 1051C RTC

The invention claimed is:

1. A first information processing apparatus, comprising:
  a central processing unit (CPU) configured to:
    acquire sensor data from a sensor that corresponds to a second information processing apparatus using a communication network;
    execute at least one of a face recognition, a voice recognition, or a biometric authentication based on the acquired sensor data;
    detect, based on the execution of the at least one of the face recognition, the voice recognition, or the biometric authentication, a person who approaches a housing part that corresponds to the second information processing apparatus;
    estimate a likelihood of the detected person to violate a rule based on opening of an opening/closing part of the housing part, wherein
      the estimation is based on a rule violation history that indicates a number of times the detected person has violated the rule, and the rule violation history is based on a past action history of the detected person to violate the rule;
    lock the opening/closing part of the housing part;
    control output of a warning to follow the rule; and
    unlock the opening/closing part of the housing part.

2. The first information processing apparatus according to claim 1, wherein the CPU is further configured to:
  lock the opening/closing part of the housing part based on the estimated likelihood of the detected person to violate the rule, wherein the violation of the rule is based on the opening of the opening/closing part.

3. The first information processing apparatus according to claim 1, wherein
  the second information processing apparatus is a garbage pickup box, and
  the CPU is further configured to:
    detect the person who approaches the garbage pickup box;
    estimate the likelihood of the detected person to violate the rule after a lid part of the garbage pickup box is opened, wherein the rule corresponds to a garbage disposal rule;
    lock the lid part of the garbage pickup box;
    control output of a warning to follow the garbage disposal rule; and
    unlock the lid part of the garbage pickup box.

4. The first information processing apparatus according to claim 3, wherein the CPU is further configured to estimate the likelihood of the detected person to violate the garbage disposal rule based on each of a current time/date and a garbage disposal time/date in the garbage disposal rule.

5. The first information processing apparatus according to claim 3, wherein the rule violation history corresponds to a past garbage disposal rule violation history of the detected person.

6. The first information processing apparatus according to claim 1, wherein
  the second information processing apparatus is a refrigerator, and the CPU is further configured to:
    detect the person who approaches the refrigerator;
    estimate the likelihood of the detected person to overeat after a door part of the refrigerator is opened;
    lock the door part of the refrigerator;
    control output of a warning against overeating; and
    unlock the door part of the refrigerator.

7. The first information processing apparatus according to claim 6, wherein the rule violation history is based on a past door opening/closing history of the detected person.

8. The first information processing apparatus according to claim 1, wherein
    the second information processing apparatus is a moving object, and
    the CPU is further configured to:
        detect, based on the acquired sensor data, the person who starts up the moving object;
        estimate the likelihood of the detected person to violate the rule after the moving object is started by the detected person;
        restrict startup of the moving object;
        control the output of the warning to follow the rule; and
        remove the restriction of the startup of the moving object.

9. The first information processing apparatus according to claim 8, wherein the CPU is further configured to:
    restrict a physical operation on one of a startup key, a button, or a switch as the restriction of the startup of the moving object; or
    restrict an engine ignition operation as the restriction of the startup of the moving object.

10. The first information processing apparatus according to claim 8, wherein the CPU is further configured to:
    detect the person who drives an automobile as the moving object; and
    estimate, based on the rule violation history, the likelihood of the detected person to violate a traffic rule after the detected person starts to drive, wherein the rule violation history corresponds to a past traffic rule violation history of the detected person.

11. The first information processing apparatus according to claim 1, wherein the CPU is further configured to:
    detect, based on the acquired sensor data, that a hand of the person approaches the second information processing apparatus; and
    control output of a warning to the detected person who is likely to violate the rule.

12. The first information processing apparatus according to claim 1, wherein
    the second information processing apparatus is a music player, and
    the CPU is further configured to:
        detect, based on the acquired sensor data, the person who starts up the music player;
        estimate, based on the rule violation history, the likelihood of the detected person to listen to music reproduced in the music player at a sound volume that exceeds a specific value, wherein the rule violation history corresponds to a past sound volume adjustment history of the detected person;
        restrict reproduction operation of the music player;
        control output of a warning to listen at an appropriate sound volume; and
        remove the restriction of the reproduction operation of the music player.

13. An information processing method, comprising:
    in a first information processing apparatus:
        acquiring, by a central processing unit (CPU) of the first information processing apparatus, sensor data from a sensor that corresponds to a second information processing apparatus using a communication network;
        executing, by the CPU, at least one of a face recognition, a voice recognition, or a biometric authentication based on the acquired sensor data;
        detecting, by the CPU, a person who approaches a housing part that corresponds to the second information processing apparatus, wherein the detection of the person is based on the execution of the at least one of the face recognition, the voice recognition, or the biometric authentication;
        estimating, by the CPU, a likelihood of the detected person to violate a rule based on opening of an opening/closing part of the housing part, wherein
            the estimation is based on a rule violation history that indicates a number of times the detected person has violated the rule, and the rule violation history is based on a past action history of the detected person to violate the rule;
        locking the opening/closing part of the housing part;
        controlling output of a warning to follow the rule; and
        unlocking the opening/closing part of the housing part.

14. A non-transitory computer-readable medium having stored thereon, computer-executable instructions which, when executed by a processor, cause the processor to execute operations, the operations comprising:
    acquiring sensor data from a sensor that corresponds to an information processing apparatus using a communication network;
    executing at least one of a face recognition, a voice recognition, or a biometric authentication based on the acquired sensor data;
    detecting, based on the execution of the at least one of the face recognition, the voice recognition, or the biometric authentication, a person who approaches a housing part that corresponds to the information processing apparatus;
    estimating a likelihood of the detected person to violate a rule based on opening of an opening/closing part of the housing part, wherein
        the estimation is based on a rule violation history that indicates a number of times the detected person has violated the rule, and the rule violation history is based on a past action history of the detected person to violate the rule;
    locking the opening/closing part of the housing part;
    controlling output of a warning to follow the rule; and
    unlocking the opening/closing part of the housing part.

* * * * *